(12) United States Patent
Yamashita et al.

(10) Patent No.: US 12,186,844 B2
(45) Date of Patent: Jan. 7, 2025

(54) FASTENING TOOL

(71) Applicant: MAX CO., LTD., Tokyo (JP)

(72) Inventors: Michio Yamashita, Tokyo (JP); Yusuke Osawa, Tokyo (JP); Kazuya Takeuchi, Tokyo (JP)

(73) Assignee: Max Co., Ltd., Tokyo (JP)

( * ) Notice: Subject to any disclaimer, the term of this patent is extended or adjusted under 35 U.S.C. 154(b) by 214 days.

(21) Appl. No.: 17/687,447

(22) Filed: Mar. 4, 2022

(65) Prior Publication Data

US 2022/0281080 A1  Sep. 8, 2022

(30) Foreign Application Priority Data

Mar. 4, 2021 (JP) .................. 2021-034722
Mar. 4, 2021 (JP) .................. 2021-034723
Mar. 4, 2021 (JP) .................. 2021-034724
Mar. 4, 2021 (JP) .................. 2021-034725
Sep. 14, 2021 (JP) .................. 2021-149653
Sep. 14, 2021 (JP) .................. 2021-149654

(51) Int. Cl.
| | | |
|---|---|---|
| B23P 19/06 | (2006.01) | |
| B23B 31/12 | (2006.01) | |
| B25B 21/00 | (2006.01) | |
| B25B 21/02 | (2006.01) | |
| B25B 23/00 | (2006.01) | |
| B25B 27/00 | (2006.01) | |

(Continued)

(52) U.S. Cl.
CPC ............ *B23P 19/06* (2013.01); *B23B 31/12* (2013.01); *B25B 21/00* (2013.01); *B25B 21/02* (2013.01); *B25B 21/023* (2013.01); *B25B 23/0064* (2013.01); *B25B 27/0085* (2013.01); *B25F 5/02* (2013.01); *B25B 23/06* (2013.01)

(58) Field of Classification Search
CPC ........... B23P 19/06; B23B 31/12; B23B 21/00
See application file for complete search history.

(56) References Cited

U.S. PATENT DOCUMENTS 3,688,966 A  9/1972  Garry et al.
3,708,097 A  1/1973  Fisher
(Continued)

FOREIGN PATENT DOCUMENTS

CA  2978391 A1  3/2019
CN  104972438 A  10/2015
(Continued)

OTHER PUBLICATIONS

Extended European Search Report dated Aug. 1, 2022, issued by the European Patent Office in the corresponding European Patent Application No. 22160123.0. (9 pages).

(Continued)

*Primary Examiner* — Nathaniel C Chukwurah
(74) *Attorney, Agent, or Firm* — Banner & Witcoff, Ltd.

(57) ABSTRACT

A fastening tool includes: a cylindrical rotation guide member extending in one direction and rotatably supported; a holding member having an opening to which a driver bit is detachably inserted, and configured to move in an axis direction along the extension direction of the rotation guide member inside the rotation guide member and to rotate together with the rotation guide member; and a moving member configured to move the holding member in a front and rear direction along the rotation guide member.

10 Claims, 19 Drawing Sheets

(51) Int. Cl.
  *B25C 5/02* (2006.01)
  *B25F 5/02* (2006.01)
  *B25B 23/06* (2006.01)

(56) References Cited

U.S. PATENT DOCUMENTS

| | | | |
|---|---|---|---|
| 3,971,421 | A | 7/1976 | Damratowski |
| 4,367,837 | A | 1/1983 | Manino |
| 4,517,863 | A | 5/1985 | Ishikawa |
| 4,581,964 | A | 4/1986 | Takatsuru |
| 4,821,937 | A | 4/1989 | Rafferty |
| 4,976,173 | A | 12/1990 | Yang |
| 5,027,679 | A | 7/1991 | Kawashima et al. |
| 5,144,870 | A | 9/1992 | Nick |
| 5,186,085 | A | 2/1993 | Monacelli |
| 5,346,453 | A | 9/1994 | Rivera-Bottzeck |
| 5,425,293 | A | 6/1995 | Nakazato et al. |
| 5,469,924 | A | 11/1995 | Kanamori et al. |
| 5,549,169 | A | 8/1996 | Matsumura et al. |
| 5,890,405 | A | 4/1999 | Becker |
| 5,921,156 | A | 7/1999 | Takezaki et al. |
| 5,931,366 | A | 8/1999 | Muro |
| 5,996,874 | A | 12/1999 | Fukushima et al. |
| 6,061,901 | A | 5/2000 | Tanaka |
| 6,096,042 | A | 8/2000 | Herbert |
| 6,655,573 | B1 | 12/2003 | Chang et al. |
| 6,915,724 | B2 | 7/2005 | Kigel et al. |
| 7,055,728 | B2 | 6/2006 | Lin |
| 7,150,384 | B2 | 12/2006 | Yasuike et al. |
| 7,225,962 | B2 | 6/2007 | Porth et al. |
| 7,802,500 | B2 * | 9/2010 | Kolodziej ................. B25C 1/04 81/57.44 |
| 7,866,236 | B2 | 1/2011 | Hsu |
| 8,371,489 | B2 | 2/2013 | Ogawa et al. |
| 8,490,516 | B2 | 7/2013 | Baba et al. |
| 8,701,956 | B2 | 4/2014 | Takemura et al. |
| 9,789,596 | B2 | 10/2017 | Moriwaki et al. |
| 10,820,911 | B2 | 11/2020 | Delman et al. |
| 2003/0154824 | A1 | 8/2003 | Wakabayashi et al. |
| 2004/0006861 | A1 | 1/2004 | Haytayan |
| 2005/0279517 | A1 | 12/2005 | Hoffman et al. |
| 2007/0108250 | A1 | 5/2007 | Odoni et al. |
| 2007/0246502 | A1 | 10/2007 | Liu et al. |
| 2008/0105725 | A1 | 5/2008 | Tamura et al. |
| 2011/0073336 | A1 | 3/2011 | Baba et al. |
| 2011/0245833 | A1 | 10/2011 | Anderson |
| 2011/0303721 | A1 | 12/2011 | Miescher et al. |
| 2012/0153003 | A1 | 6/2012 | Dittrich |
| 2013/0255447 | A1 * | 10/2013 | Po ........................ B25B 23/045 81/57.11 |
| 2013/0255984 | A1 | 10/2013 | Po |
| 2013/0284788 | A1 | 10/2013 | Gerold et al. |
| 2015/0080966 | A1 | 3/2015 | Anderson |
| 2015/0306752 | A1 | 10/2015 | Shen et al. |
| 2015/0336224 | A1 | 11/2015 | Liu et al. |
| 2018/0093367 | A1 | 4/2018 | Andriolo et al. |
| 2018/0207759 | A1 | 7/2018 | Gray |
| 2019/0099872 | A1 | 4/2019 | Tanaka |
| 2019/0118361 | A1 | 4/2019 | Takeuchi et al. |
| 2020/0100799 | A1 | 4/2020 | Delman et al. |
| 2020/0298382 | A1 | 9/2020 | Clark |
| 2020/0306941 | A1 | 10/2020 | Akiba et al. |
| 2021/0146489 | A1 | 5/2021 | Ogata et al. |
| 2022/0126409 | A1 | 4/2022 | Sugioka et al. |

FOREIGN PATENT DOCUMENTS

| | | | |
|---|---|---|---|
| CN | 107914242 | A | 4/2018 |
| CN | 110576405 | A | 12/2019 |
| DE | 3930999 | A1 | 3/1991 |
| EP | 2218552 | A2 | 8/2010 |
| JP | S63-300830 | A | 12/1988 |
| JP | UM-H03-047781 | A | 5/1991 |
| JP | H06-262453 | A | 9/1994 |
| JP | H06-312382 | A | 11/1994 |
| JP | H07-241780 | A | 9/1995 |
| JP | H07-266246 | A | 10/1995 |
| JP | H10-235572 | A | 9/1998 |
| JP | 2000-516109 | A | 12/2000 |
| JP | 2002-346947 | A | 12/2002 |
| JP | 5262461 | B2 | 8/2013 |
| JP | 5590505 | B2 | 9/2014 |
| JP | 2015-066661 | A | 4/2015 |
| JP | 2016221595 | A | 12/2016 |
| JP | 6197547 | B2 | 9/2017 |
| JP | 6479248 | B1 | 3/2019 |
| JP | 2019-076979 | A | 5/2019 |
| JP | 2020-006452 | A | 1/2020 |
| WO | 95/05261 | A1 | 2/1995 |
| WO | 98-010900 | A2 | 3/1998 |
| WO | 2020009159 | A1 | 1/2020 |

OTHER PUBLICATIONS

Extended European Search Report dated Aug. 1, 2022, issued by the European Patent Office in the corresponding European Patent Application No. 22160125.5. (9 pages).
Extended European Search Report dated Aug. 1, 2022, issued by the European Patent Office in the corresponding European Patent Application No. 22160119.8. (9 pages).
Extended European Search Report dated Aug. 1, 2022, issued by the European Patent Office in the corresponding European Patent Application No. 22160134.7. (10 pages).
Extended European Search Report dated Aug. 1, 2022, issued by the European Patent Office in the corresponding European Patent Application No. 22160138.8. (8 pages).
Extended European Search Report dated Nov. 23, 2022, issued by the European Patent Office in the corresponding European Patent Application No. 22160121.4. (8 pages).
U.S. Appl. No. 17/686,981, Fastening Tool, 1) Michio Yamashita 2) Yusuke Osawa 3) Kazuya Takeuchi.
U.S. Appl. No. 17/687,033, Fastening Tool, 1) Michio Yamashita 2) Yusuke Osawa 3) Kazuya Takeuchi.
U.S. Appl. No. 17/687,099, Fastening Tool, 1) Michio Yamashita 2) Yusuke Osawa 3) Kazuya Takeuchi.
U.S. Appl. No. 17/687,365, Fastening Tool, 1) Michio Yamashita 2) Yusuke Osawa 3) Kazuya Takeuchi.
U.S. Appl. No. 17/687,447, Fastening Tool, 1) Michio Yamashita 2) Yusuke Osawa 3) Kazuya Takeuchi.
U.S. Appl. No. 17/687,206, Fastening Tool, 1) Michio Yamashita 2) Yusuke Osawa 3) Kazuya Takeuchi.
Apr. 11, 2024—U.S.—Non-final Office Action—U.S. Appl. No. 17/687,033.
May 3, 2024—U.S.—Non-final Office Action—U.S. Appl. No. 17/686,981.
Mar. 8, 2024—U.S.—Non-final Office Action—U.S. Appl. No. 17/687,365.
Jun. 12, 2024—U.S.—Non-final Office Action—U.S. Appl. No. 17/687,099.
Jun. 24, 2024 (EP) Search Report—App 24166431.7.
Aug. 5, 2024—(US)—Notice of Allowance—U.S. Appl. No. 17/687,206.
Aug. 14, 2024—(US) Notice of Allowance—U.S. Appl. No. 17/686,981.
Aug. 30, 2024—(US)—Final Office Action—U.S. Appl. No. 17/687,365.
Nov. 15, 2024—(US)—Final Office Action—U.S. Appl. No. 17/687,033.

* cited by examiner

FASTENING TOOL

CROSS-REFERENCE TO RELATED APPLICATIONS

This application is based on and claims priority under 35 USC 119 from Japanese Patent Application No. 2021-034722 filed on Mar. 4, 2021, Japanese Patent Application No. 2021-034723 filed on Mar. 4, 2021, Japanese Patent Application No. 2021-034724 filed on Mar. 4, 2021, Japanese Patent Application No. 2021-034725 filed on Mar. 4, 2021, Japanese Patent Application No. 2021-149653 filed on Sep. 14, 2021, and Japanese Patent Application No. 2021-149654 filed on Sep. 14, 2021, the contents of which are incorporated herein by reference and priority is claimed to each.

TECHNICAL FIELD

The present invention relates to a fastening tool configured to engage a driver bit with a screw, to push and press the screw against a fastening target with the driver bit, and to rotate the driver bit for screwing.

BACKGROUND ART

Known is a tool called a portable striking machine configured to strike out connected stoppers loaded in a magazine sequentially from a tip end of a driver guide by using an air pressure of a compressed air supplied from an air compressor or a combustion pressure of a gas.

As a tool configured to fasten a screw by rotating a bit and to move the bit in a direction in which the screw is fastened, in a tool configured to use an air pressure, in the related art, suggested is an air pressure-type screw striking machine configured to rotate a bit by an air motor and to move the bit by an air pressure in a direction in which a screw is fastened (for example, refer to PTL 1).

In addition, suggested is a screw striking machine configured to compress a spring by a drive force of a motor configured to rotate a screw, and to strike the screw by urging of the spring (for example, refer to PTL 2).

CITATION LIST

Patent Literature

PTL 1: Japanese Patent No. 5,262,461
PTL 2: Japanese Patent No. 6,197,547

In the screw striking machine configured to use an air pressure, a piston can be used for the configuration where the driver bit is moved in the direction in which the screw is fastened. However, a configuration for rotating the driver bit has a complicated mechanism. In addition, in the screw striking machine configured to strike a screw with the urging of the spring, the interlocking of the configuration of moving the driver bit in the direction in which the screw is fastened and the configuration of rotating the driver bit is made by a complicated mechanism.

Further, in the screw striking machine configured to use an air pressure, the driver bit is attached to the piston but replacement of the driver bit cannot be easily performed. In addition, in the related art, known is a configuration where a ball and a spring for urging the ball are provided and a driver bit is detachably held by causing the ball to engage with the driver bit. In such a known attaching/detaching holding mechanism of the driver bit, it is necessary to retreat the ball in operations of inserting and removing the driver bit. For this reason, in a configuration where a space for retreating the ball cannot be secured, such known technology cannot be adopted.

SUMMARY

The present invention has been made to solve such problems, and an object of the present invention is to provide a fastening tool capable of implementing rotation of a driver bit and movement in a direction in which a screw is fastened with a simple configuration.

Another object of the present invention is to provide a fastening tool configured to implement rotation of a driver bit and movement in a direction in which a screw is fastened with a simple configuration, and to adopt a known attaching/detaching holding mechanism of a driver bit.

In order to solve the above-described problems, the present invention provides a fastening tool including a cylindrical rotation guide member extending in one direction and rotatably supported by a bearing; a holding member to which a driver bit is detachably attached, the holding member being configured to move in an axis direction along the extension direction of the rotation guide member inside the rotation guide member and to rotate together with the rotation guide member; and a moving member configured to move the holding member in a front and rear direction along the rotation guide member.

In addition, the present invention provides a fastening tool including a cylindrical rotation guide member extending in one direction and rotatably supported by a bearing; a holding member having an attaching/detaching holding mechanism configured to detachably hold a driver bit and provided in an opening in which the driver bit is inserted, and configured to move in an axis direction along the extension direction of the rotation guide member inside the rotation guide member and to rotate together with the rotation guide member; and a moving member configured to move the holding member in a front and rear direction along the rotation guide member, wherein the rotation guide member has a groove portion extending in the axis direction, wherein the holding member and the rotation guide member are connected via a connecting member configured to enter the groove portion, wherein the attaching/detaching holding mechanism includes a ball exposed in the opening and a spring for urging the ball in a direction in which the ball is exposed in the opening, and wherein the connecting member and the ball of the holding member are provided coaxially along the axis direction of the rotation guide member.

DESCRIPTION OF EMBODIMENTS

Hereinafter, an embodiment of the fastening tool of the present invention will be described with reference to the drawings.

Configuration Example of Fastening Tool of Present Embodiment

Figure 1A:
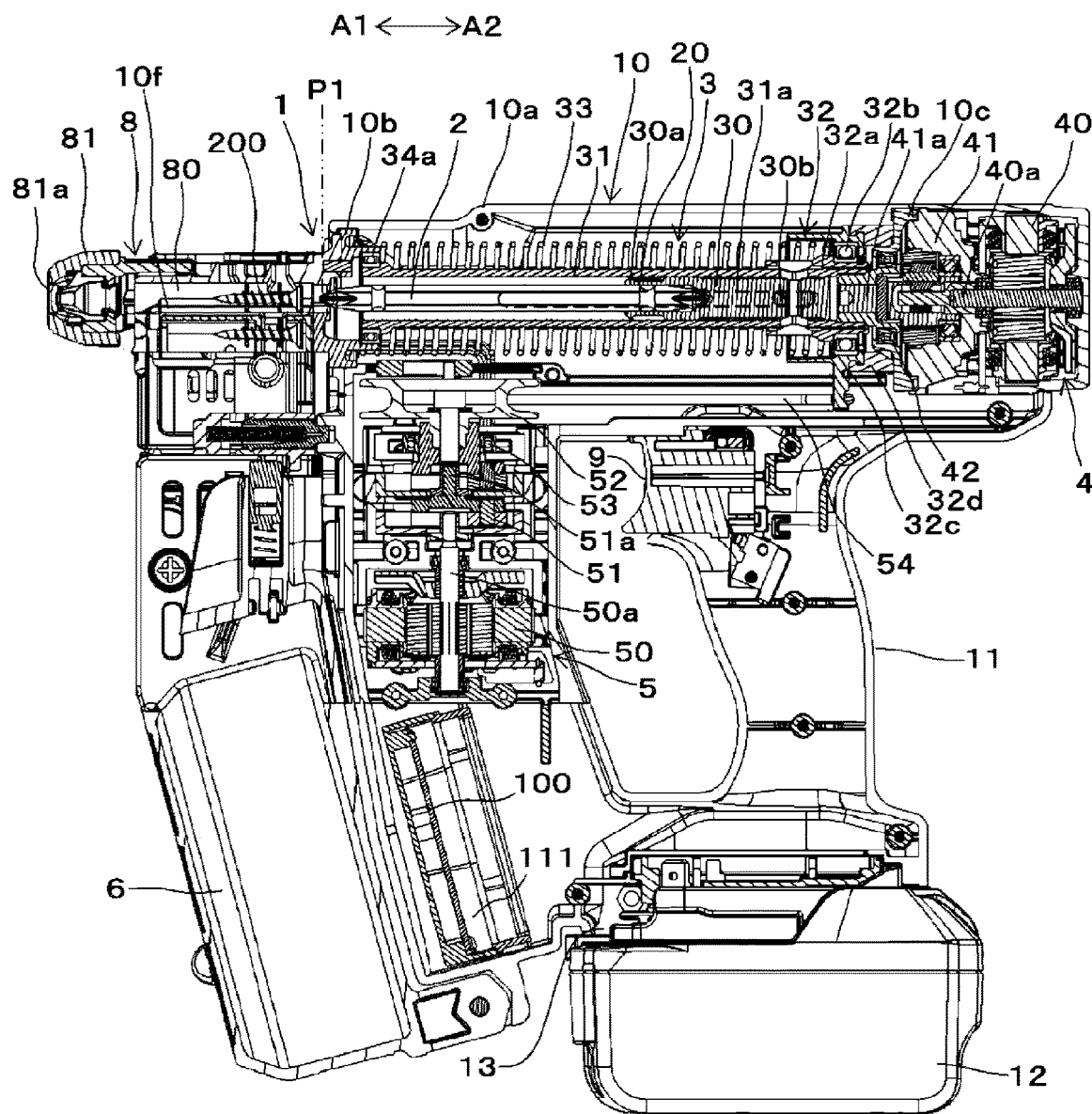
FIG. 1A is a side cross-sectional view showing an example of an internal structure of a fastening tool according to the present embodiment.
Figure 1B:
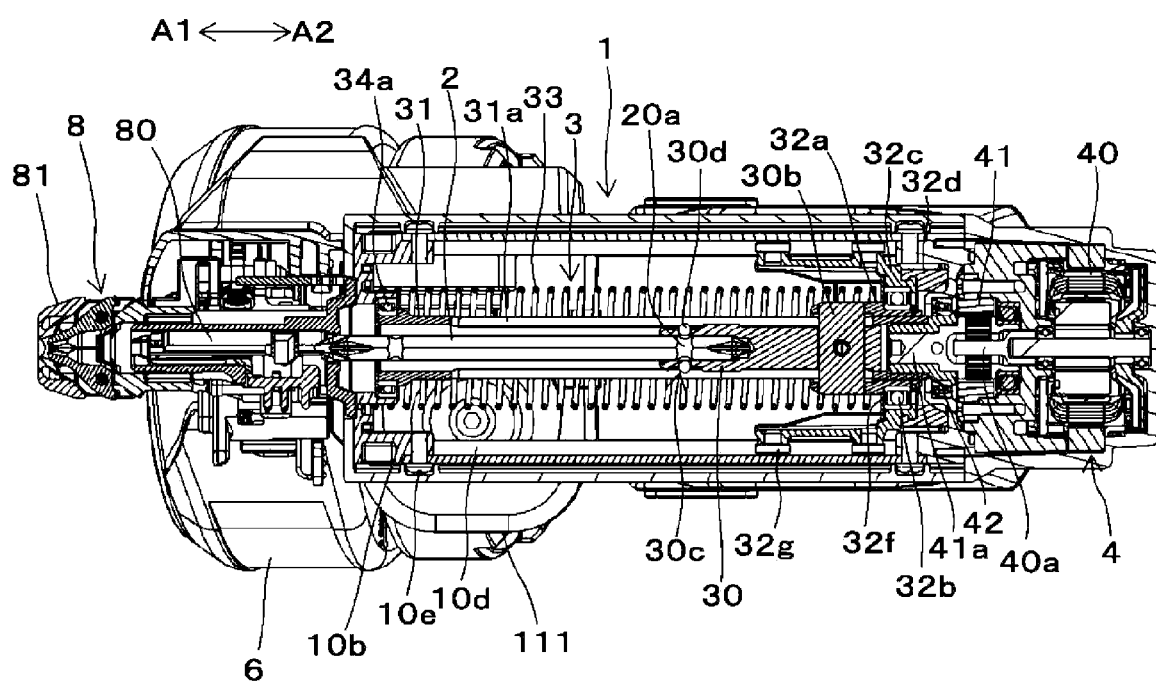
FIG. 1B is a top cross-sectional view showing the example of the internal structure of the fastening tool according to the present embodiment.
Figure 1C:
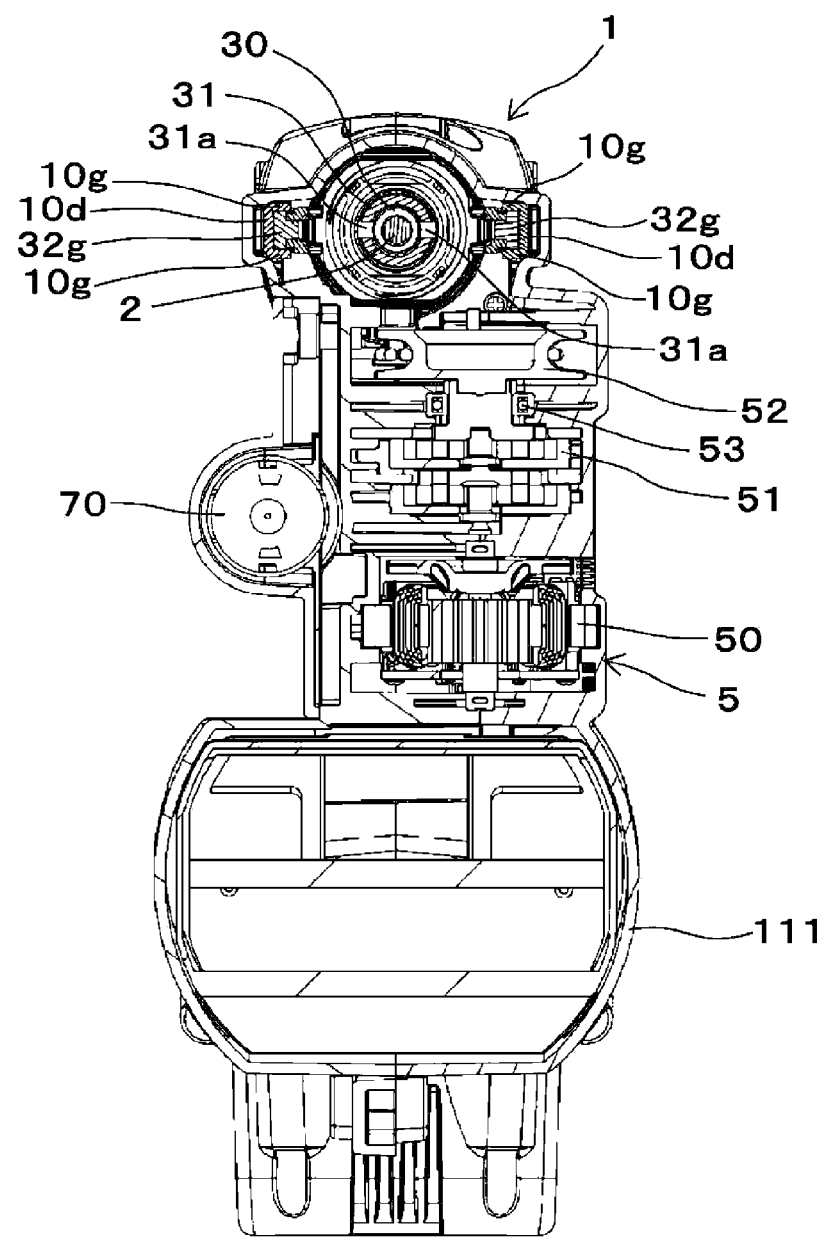
FIG. 1C is a front cross-sectional view showing the example of the internal structure of the fastening tool according to the present embodiment.
Figure 2A:
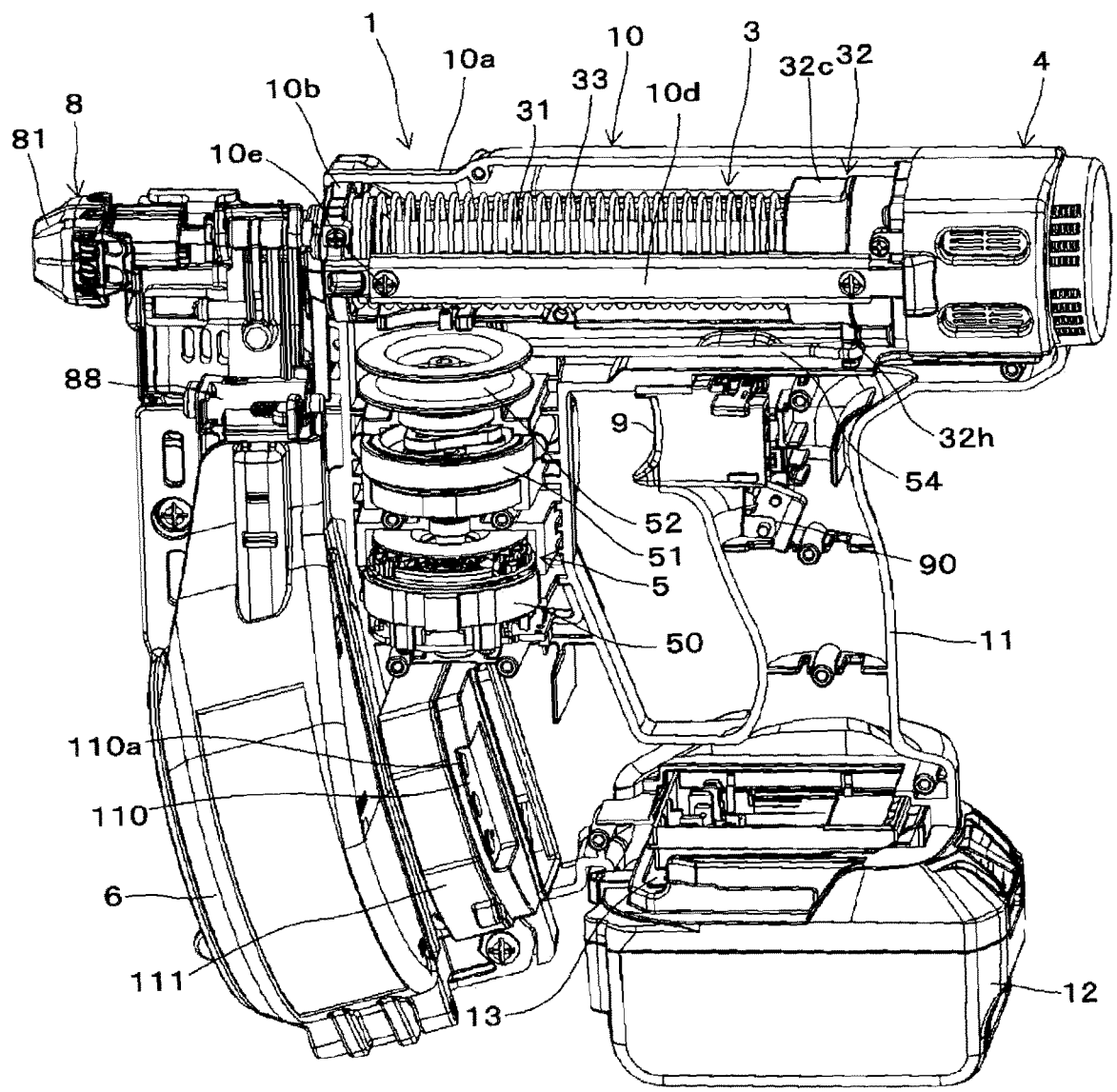
FIG. 2A is an exploded perspective view showing the example of the internal structure of the fastening tool according to the present embodiment.
Figure 2B:
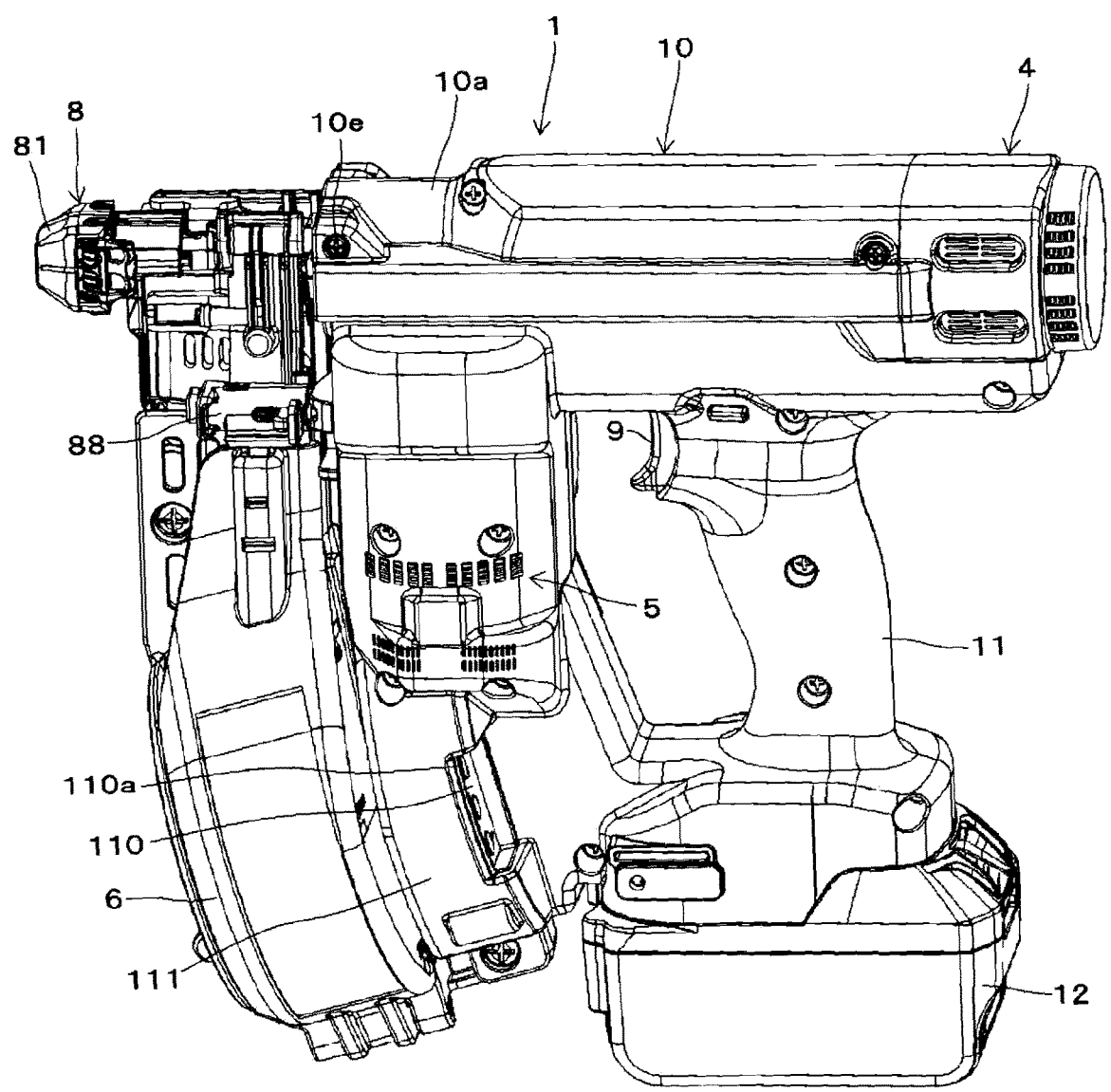
FIG. 2B is an outer perspective view showing an example of the fastening tool according to the present embodiment.

FIG. 1A is a side cross-sectional view showing an example of an internal structure of a fastening tool according to the present embodiment, FIG. 1B is a top cross-sectional view showing the example of the internal structure of the fastening tool according to the present embodiment, and FIG. 1C is a front cross-sectional view showing the example of the internal structure of the fastening tool according to the present embodiment. In addition, FIG. 2A is an exploded perspective view showing the example of the internal structure of the fastening tool according to the present embodiment, and FIG. 2B is an outer perspective view showing an example of the fastening tool according to the present embodiment.

A fastening tool 1 of the present embodiment includes a bit holding unit 3 configured to hold a driver bit 2 so as to be rotatable and to be movable in an axis direction, a first drive unit 4 configured to rotate the driver bit 2 held by the bit holding unit 3, and a second drive unit 5 configured to move the driver bit 2 held by the bit holding unit 3 in the axis direction.

In addition, the fastening tool 1 includes a screw accommodating unit 6 in which a screw 200 is accommodated, a screw feeding unit 7 configured to feed the screw accommodated in the screw accommodating unit 6, and a nose unit 8 configured to be pressed against a fastening target to which the screw 200 is to be fastened, and to eject the screw.

In addition, the fastening tool 1 includes a tool body 10 and a handle 11. Further, the fastening tool 1 includes a battery attaching part 13 to which a battery 12 is detachably attached, at an end portion of the handle 11.

In the fastening tool 1, the tool body 10 extends in one direction along an axis direction of the driver bit 2 denoted with arrows A1 and A2, and the handle 11 extends in another direction intersecting with the extension direction of the tool body 10. In the fastening tool 1, the extension direction of the tool body 10, i.e., the axis direction of the driver bit 2 denoted with arrows A1 and A2 is referred to as 'front and rear direction'. In addition, in the fastening tool 1, the extension direction of the handle 11 is referred to as 'upper and lower direction'. Further, in the fastening tool 1, a direction orthogonal to the extension direction of the tool body 10 and the extension direction of the handle 11 is referred to as 'right and left direction'.

The first drive unit 4 is provided at the rear, which is one side of the tool body 10, with the handle 11 interposed therebetween. In addition, the second drive unit 5 is provided at the front, which is the other side of the tool body 10, with the handle 11 interposed therebetween.

In the screw accommodating unit 6, a plurality of screws 200 are connected by a connecting band and a spirally wound connected screw is accommodated.

Figure 3A:
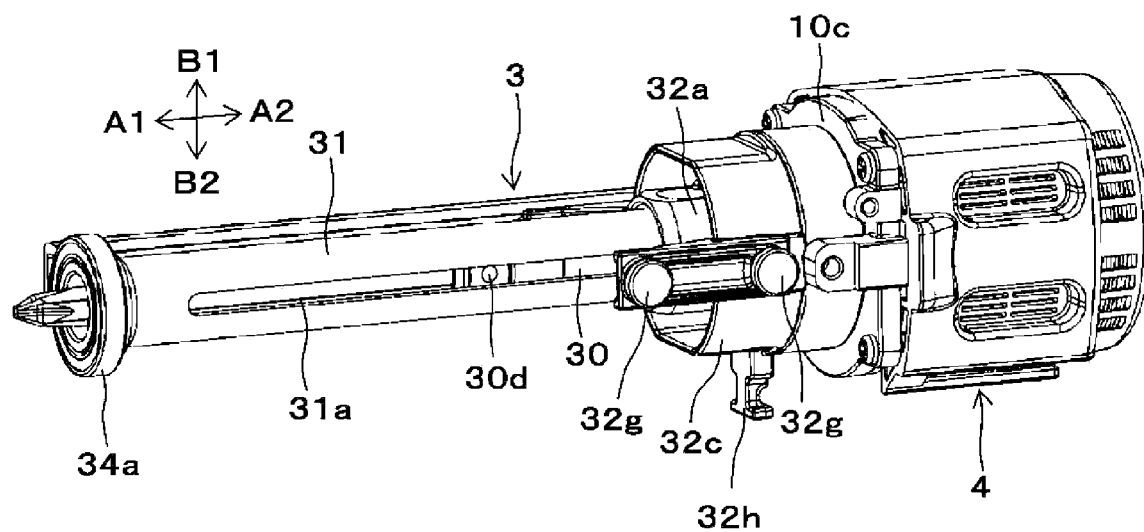
FIG. 3A is a perspective view showing an example of a main part configuration of the fastening tool according to the present embodiment.
Figure 3B:
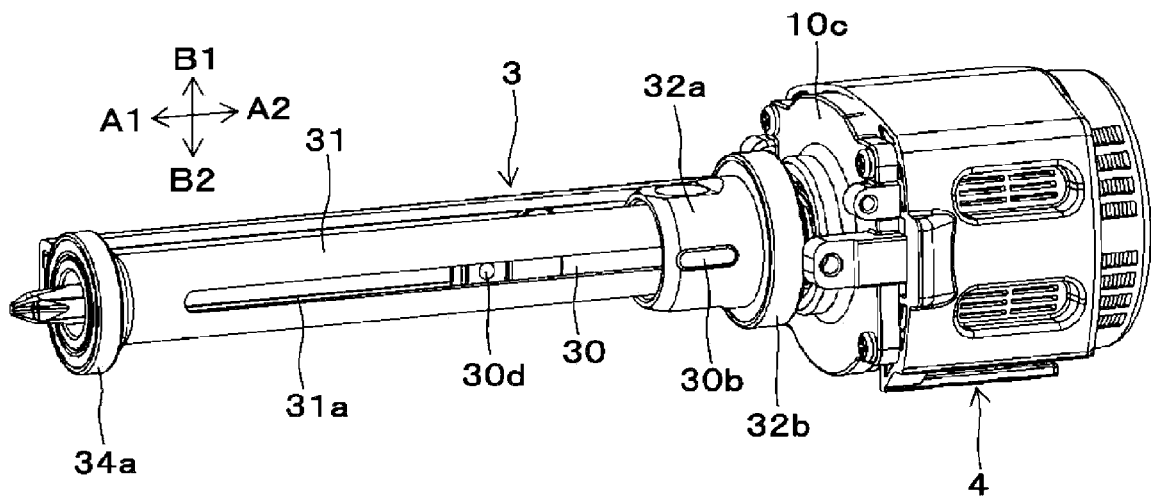
FIG. 3B is a perspective view showing the example of the main part configuration of the fastening tool according to the present embodiment.
Figure 4A:
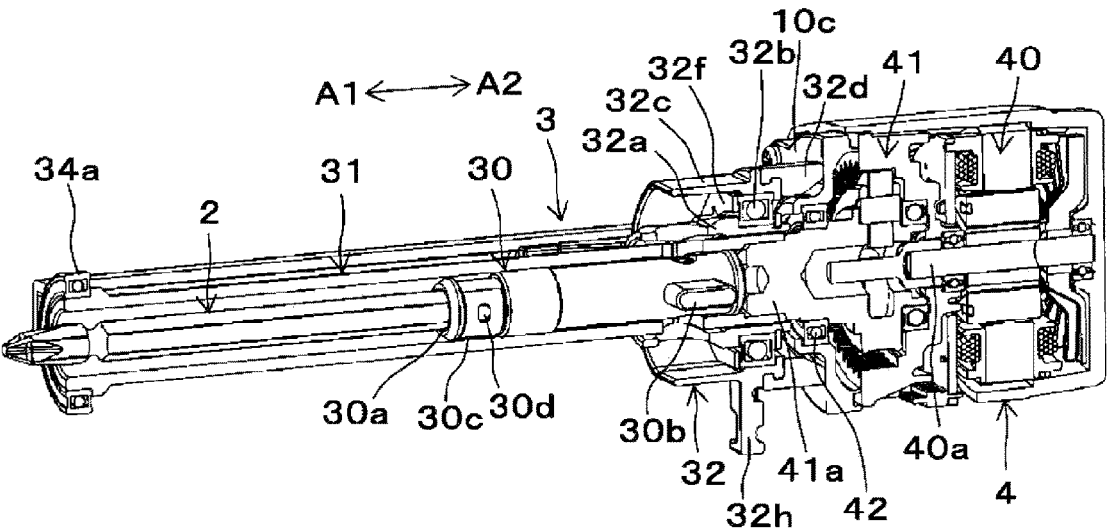
FIG. 4A is a sectional perspective view showing the example of the main part configuration of the fastening tool according to the present embodiment.
Figure 4B:
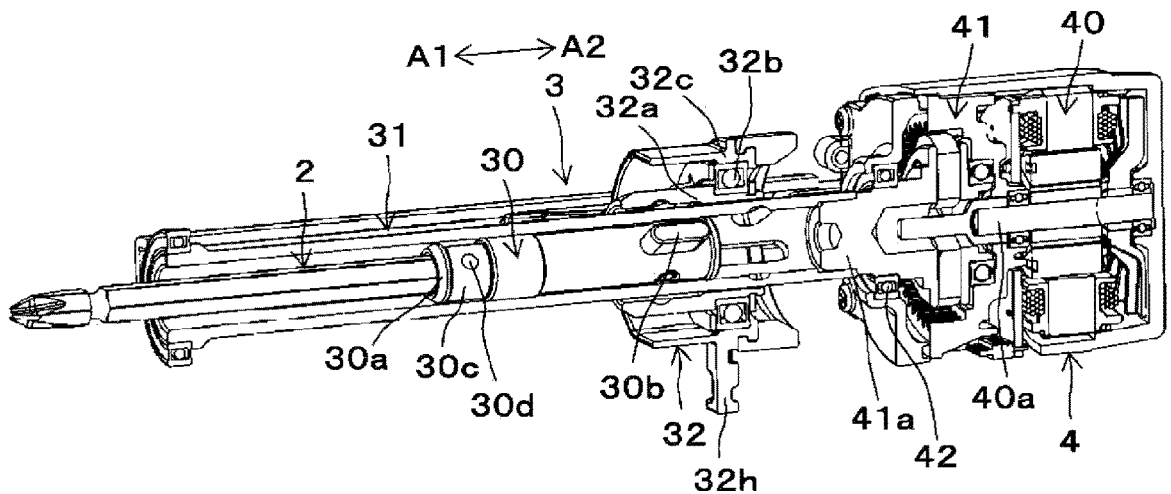
FIG. 4B is a sectional perspective view showing the example of the main part configuration of the fastening tool according to the present embodiment.
Figure 4C:
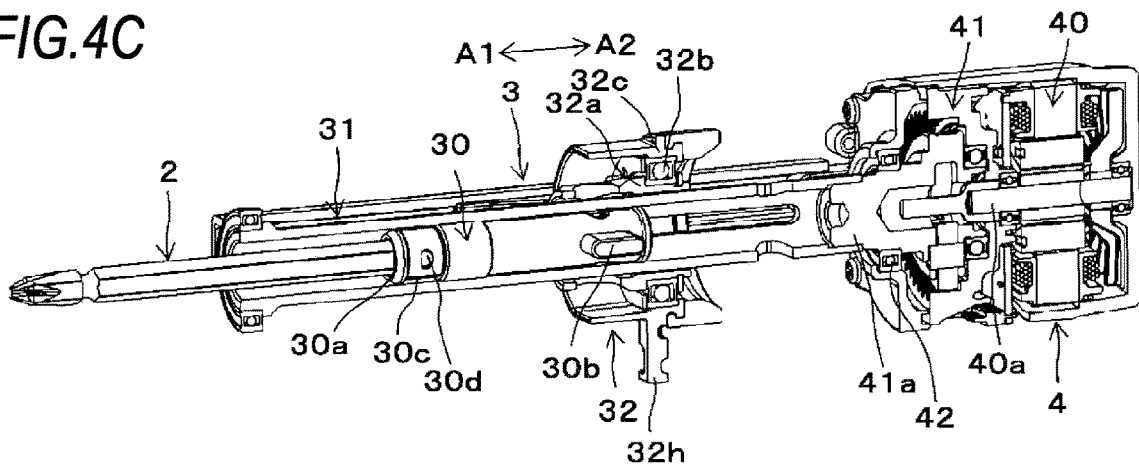
FIG. 4C is a sectional perspective view showing the example of the main part configuration of the fastening tool according to the present embodiment.
Figure 5:
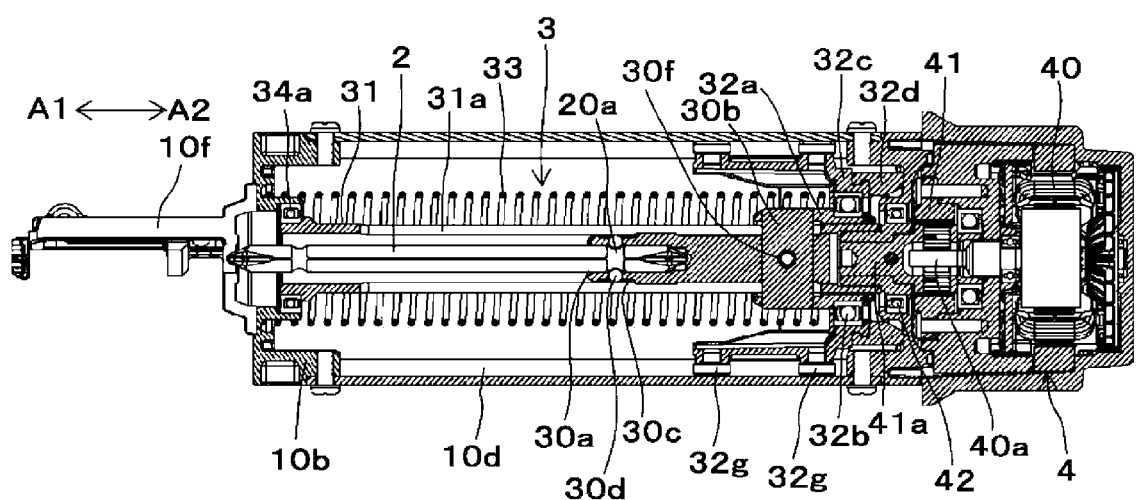
FIG. 5 is a top cross-sectional view showing the example of the main part configuration of the fastening tool according to the present embodiment.

FIGS. 3A and 3B are perspective views showing an example of a main part configuration of the fastening tool according to the present embodiment, FIGS. 4A to 4C are sectional perspective views showing the example of the main part configuration of the fastening tool according to the present embodiment, and FIG. 5 is a top cross-sectional view showing the example of the main part configuration of the fastening tool according to the present embodiment, showing details of the bit holding unit 3 and the first drive unit 4. Next, the bit holding unit 3 and the first drive unit 4 are described with reference to the respective drawings.

The bit holding unit 3 includes a holding member 30 configured to detachably hold the driver bit 2, a rotation guide member 31 configured to support the holding member 30 so as to be movable in the front and rear direction denoted with the arrows A1 and A2 along the axis direction of the driver bit 2, and to rotate together with the holding member 30, a moving member 32 configured to move the holding member 30 in the front and rear direction along the rotation guide member 31, and an urging member 33 configured to urge the moving member 32 in a rearward direction denoted with the arrow A2.

The holding member 30 is constituted by, for example, a circular cylinder-shaped member having an outer diameter slightly smaller than an inner diameter of the rotation guide member 31, and configured to be inserted inside the rotation guide member 31. The holding member 30 is provided at an end portion on a front side along the axis direction of the driver bit 2 with an opening 30a having a shape that matches a cross-sectional shape of the driver bit 2. The holding member 30 has an attaching/detaching holding mechanism 30c configured to detachably hold the driver bit 2 and provided in the opening 30a. In the holding member 30, the opening 30a is exposed inside the rotation guide member 31, and the driver bit 2 is detachably inserted in the opening 30a.

The rotation guide member 31 extends along the extension direction of the tool body 10, i.e., the front and rear direction denoted with the arrows A1 and A2 along the axis direction of the driver bit 2. The rotation guide member 31 has a cylindrical shape in which the holding member 30 is inserted, and an end portion on a front side is rotatably supported via a bearing 34a, which is an example of the bearing, by a metal front frame 10b provided on a front side of a resin case 10a constituting an exterior of the tool body 10. In addition, an end portion on a rear side of the rotation guide member 31 is connected to the first drive unit 4.

In the rotation guide member 31, groove portions 31a extending in the front and rear direction denoted with the arrows A1 and A2 along the axis direction of the driver bit 2 are formed at two locations on side parts facing in a radial direction. The rotation guide member 31 is connected to the holding member 30 via connecting members 30b configured to penetrate the holding member 30 in the radial direction and to protrude from both sides of the holding member 30 as the connecting members 30b enter the groove portions 31a.

The holding member 30 is provided with hole portions penetrating in a direction perpendicular to a rotation direction of the driver bit 2, and the connecting members 30b are inserted into the hole portions and fixed by pins 30f. The connecting member 30b is constituted by a cylindrical member having an oval cross section.

In the connecting member 30b, a long-side direction of the oval shape is a direction along the extension direction of the groove portion 31a parallel to the axis direction of the driver bit 2 denoted with the arrows A1 and A2, and a short-side direction of the oval shape is a direction (denoted with arrows B1 and B2) orthogonal to the extension direction of the groove portion 31a, i.e., a direction along the rotation direction of the rotation guide member 31. The connecting member 30b is configured such that a width of the oval shape in the short-side direction, i.e., a width along the rotation direction of the rotation guide member 31 is slightly smaller than a width of the groove portion 31a along the same direction.

Thereby, the connecting member 30b inserted in the groove portion 31a is supported by the groove portion 31a so as to be movable along the axis direction of the rotation guide member 31. Further, the movement of the connecting member 30b along the rotation direction of the rotation guide member 31 is restricted between one side surface and the other side surface of the groove portion 31a along the extension direction of the groove portion 31a. Therefore, a rotation operation of the rotation guide member 31 causes the connecting member 30b to be pushed by one side surface or the other side surface of the groove portion 31a according to the rotation direction of the rotation guide member 31 and to be applied with a force in a circumferential force, which is the rotation direction, from the rotation guide member 31.

Therefore, when the rotation guide member 31 rotates, the connecting members 30b are pushed by the groove portions 31a of the rotation guide member 31, so that the holding member 30 rotates together with the rotation guide member 31. Further, the connecting members 30b are guided by the groove portions 31a of the rotation guide member 31, so that the holding member 30 moves in the front and rear direction along the axis direction of the driver bit 2.

The moving member 32 is an example of a transmission member, and includes a first moving member 32a configured to rotate together with the holding member 30 and to move the holding member 30 in the front and rear direction along the rotation guide member 31, a second moving member 32c configured to be supported via a bearing 32b by the first moving member 32a and to push the first moving member 32a via the bearing 32b, and a cushioning member 32d attached to a rear side of the second moving member 32c.

The first moving member 32a is constituted by, for example, a circular cylinder-shaped member having an inner diameter slightly greater than an outer diameter of the rotation guide member 31, and configured to be inserted to an outer side of the rotation guide member 31. The first moving member 32a is connected to the holding member 30 via the connecting members 30b protruding from the groove portions 31a of the rotation guide member 31, and therefore, is supported to be movable along the axis direction of the rotation guide member 31.

The bearing 32b is an example of a bearing and is inserted between an outer periphery of the first moving member 32a and an inner periphery of the second moving member 32c. The first moving member 32a constitutes a bearing inner ring holding member configured to hold an inner ring of the bearing 32b, and the second moving member 32c constitutes a bearing outer ring holding member configured to hold an outer ring of the bearing 32b. In the bearing 32b, the inner ring is supported by the outer periphery of the first moving member 32a so as not to be movable in the rotation direction and the axis direction, and the outer ring is supported by the inner periphery of the second moving member 32c so as not to be movable in the rotation direction and the axis direction.

Thereby, the second moving member 32c is connected to the first moving member 32a via the bearing 32b in a state where movement in the front and rear direction along the axis direction is restricted. In addition, the second moving member 32c is configured to rotatably support the first moving member 32a via the bearing 32b.

Therefore, as the second moving member 32c moves in the front and rear direction along the axis direction, the first moving member 32a is pushed by the second moving member 32c via the bearing 32b, and moves in the front and rear direction along the axis direction together with the second moving member 32c. In addition, the first moving member 32a is configured to be rotatable with respect to the second moving member 32c that is not rotatable with respect to the rotation guide member 31.

The urging member 33 is constituted by a coil spring, in the present example, is inserted between the front frame 10b provided on the front side of the case 10a of the tool body 10 and the second moving member 32c of the moving member 32, outside the rotation guide member 31, and is in contact with a spring seat 32f arranged to contact an end face of the outer ring of the bearing 32b. The urging member 33 is compressed as the moving member 32 moves in the forward direction denoted with the arrow A1, and urges the moving member 32 in the rearward direction denoted with the arrow A2.

The first drive unit 4 includes a bit rotating motor 40 configured to be driven by electricity supplied from the battery 12, and a speed reducer 41. The bit rotating motor 40 is an example of the first motor, in which a shaft 40a of the bit rotating motor 40 is connected to the speed reducer 41, and a shaft 41a of the speed reducer 41 is connected to the rotation guide member 31. In the first drive unit 4, the speed reducer 41 is configured to use a planetary gear, and the bit rotating motor 40 is arranged coaxially with the rotation guide member 31, the holding member 30 and the driver bit 2 held by the holding member 30.

In the first drive unit 4, the bit rotating motor 40 and the speed reducer 41 are attached to a metal rear frame 10c provided on a rear side of the case 10a of the tool body 10, and the shaft 41a of the speed reducer 41 is supported by the rear frame 10c via a bearing 42. The rotation guide member 31 is rotatably supported via the bearing 42, which is an example of a bearing, by connecting a rear end portion to the shaft 41a of the speed reducer 41 and supporting the shaft 41a to the rear frame 10c via the bearing 42.

The bit holding unit 3 and the first drive unit 4 are integrally assembled by connecting the front frame 10b and the rear frame 10c with a coupling member 10d extending in the front and rear direction, and the front frame 10b is fixed to the case 10a of the tool body 10 by a screw 10e.

Further, in the bit holding unit 3, an end portion on the front side of the rotation guide member 31 is supported via the bearing 34a by the front frame 10b fixed to the front side of the case 10a of the tool body 10, and an end portion on the rear side of the rotation guide member 31 is supported via the shaft 41a of the speed reducer 41 and the bearing 42 by the rear frame 10c fixed to the rear side of the case 10a. Therefore, in the bit holding unit 3, the rotation guide member 31 is rotatably supported by the tool body 10.

Thereby, the first drive unit 4 is configured to rotate the rotation guide member 31 by the bit rotating motor 40. When the rotation guide member 31 rotates, the connecting members 30b are pushed by the groove portions 31a of the rotation guide member 31, so that the holding member 30 configured to hold the driver bit 2 rotates together with the rotation guide member 31.

The bit holding unit 3 is provided with a guide member 32g on the second moving member 32c. The coupling member 10d is provided with a pair of guide wall portions 10g at an interval slightly larger than a diameter of the guide member 32g, and the guide member 32g is inserted between the pair of guide wall portions 10g, so that the pair of guide wall portions 10g faces a peripheral surface of the guide member 32g.

Thereby, the guide member 32g is guided to the coupling member 10d, so that the second moving member 32c can move in the front and rear direction denoted with the arrows A1 and A2 along the axis direction of the driver bit 2 and the rotation following the rotation guide member 31 is restricted.

Figure 6A:
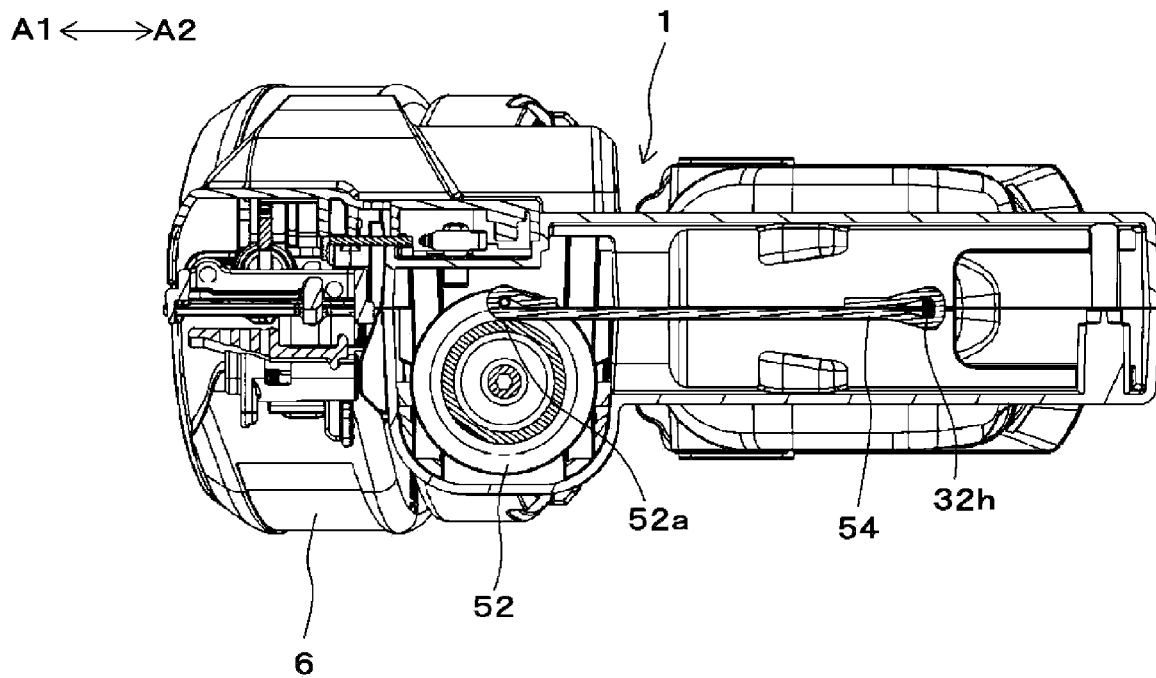
FIG. 6A is a top cross-sectional view showing the example of the internal structure of the fastening tool according to the present embodiment.
Figure 6B:
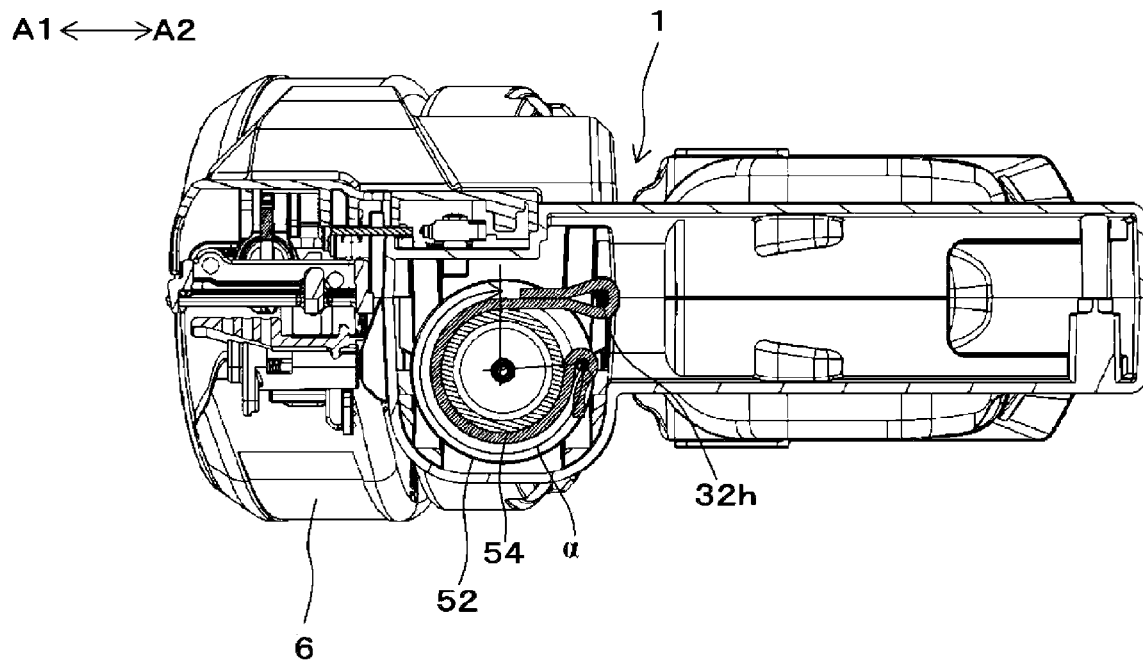
FIG. 6B is a top cross-sectional view showing the example of the internal structure of the fastening tool according to the present embodiment.

FIGS. 6A and 6B are top cross-sectional views showing the example of the internal structure of the fastening tool according to the present embodiment, showing details of the second drive unit 5. Next, the second drive unit 5 is described with reference to the respective drawings.

The second drive unit 5 includes a bit moving motor 50 configured to be driven by electricity supplied from the battery 12, and a speed reducer 51. The bit moving motor 50 is an example of the motor and the second motor, in which a shaft 50a of the bit moving motor 50 is connected to the speed reducer 51, and a shaft 51a of the speed reducer 51 is connected to a pulley 52, which is an example of the rotation member. In the second drive unit 5, the pulley 52 is supported by the tool body 10 via a bearing 53. In the second drive unit 5, the shaft 50a of the bit moving motor 50 is arranged along the extension direction of the handle 11.

In the second drive unit 5, one end of a string-like wire 54, which is an example of the transmission member, is connected to the pulley 52, and the pulley 52 rotates, so that the wire 54 is wound along an outer periphery 52a of the pulley 52. In addition, the other end of the wire 54 is connected to a wire connecting portion 32h provided on the second moving member 32c of the moving member 32. The transmission member may also be a string made of fibers or the like, a belt made of rubber or the like, or a chain made of a metal or the like, as long as it has flexibility to be wound along the outer periphery of the rotation member such as the pulley 52. When the transmission member is constituted by a chain, the rotation member may be a sprocket having teeth.

Thereby, the second drive unit 5 is configured to move the second moving member 32c in the forward direction denoted with the arrow A1 by rotating the pulley 52 by the bit moving motor 50 to wind up the wire 54. In the bit holding unit 3, when the second moving member 32c moves forward, the first moving member 32a is pushed via the bearing 32b, and the first moving member 32a moves forward along the axis direction, together with the second moving member 32c. The first moving member 32a moves forward, so that the holding member 30 connected to the first moving member 32a via the connecting members 30b moves forward and the driver bit 2 held by the holding member 30 moves in the forward direction denoted with the arrow A1.

The second drive unit 5 is arranged offset to one side with respect to a substantial center in a right and left direction of the fastening tool 1 so that a tangential direction of a portion of the pulley 52 where the wire 54 is wound follows the extension direction of the rotation guide member 31. That is, the arrangement is such that a center of the pulley 52, in the present example, the shaft 50a of the bit moving motor 50 is offset to one side with respect to the rotation guide member 31 and the outer periphery 52a of the pulley 52 on which the wire 54 is to be wound overlaps the rotation guide member 31, when seen in the axis direction of the pulley 52.

In addition, the pulley 52 and the like are arranged so that the wire 54 between the pulley 52 and the second moving member 32c is parallel to the axis direction of the rotation guide member 31 in the radial direction of the pulley 52, as shown in FIGS. 6A and 6B and is parallel to the axis direction of the rotation guide member 31 also in the axis direction of the bit moving motor 50 orthogonal to the radial direction of the pulley 52, as shown in FIG. 1A.

Further, if the wire 54 is overlapped and wound on the pulley 52, a distance from the center of the pulley 52 to the wire 54 changes according to the number of turns. Therefore, the amount of movement of the driver bit 2 when the pulley 52 makes one rotation changes. Further, an angle between a direction, in which the wire 54 is stretched between the pulley 52 and the second moving member 32c, and a moving direction of the driver bit 2 along the axis direction of the rotation guide member 31 changes.

Therefore, a diameter of the pulley 52 and the like are set so that an amount of rotation $\alpha$ of the pulley 52, which is required to move the driver bit 2 by a predetermined amount by moving the moving member 32 from one end portion to the other end portion within a movable range along one direction, is less than 360°.

Thereby, in an operation where the pulley 52 winds up the wire 54 so as to move the driver bit 2 by the predetermined amount, the wire 54 is not overlapped and wound on the pulley 52, as shown in FIG. 6B, and the amount of movement of the driver bit 2 is suppressed from being inaccurate. Further, a change in parallelism between the direction in which the wire 54 is stretched between the pulley 52 and the second moving member 32c and the moving direction of the driver bit 2 along the axis direction of the rotation guide member 31 is suppressed.

Therefore, a relationship between the amount of rotation of the bit moving motor 50 and the amount of movement of the holding member 30 becomes a one-to-one relationship over the entire movable range of the holding member 30, so that the amount of movement of the holding member 30 along the axis direction of the rotation guide member 31 can be controlled by controlling the amount of rotation of the bit moving motor 50. That is, the amount of movement of the driver bit 2 attached to the holding member 30 can be controlled by controlling the amount of rotation of the bit moving motor 50.

Further, regardless of the winding amount of the wire 54, the tension that is applied to the wire 54 is always parallel to the moving direction of the driver bit 2 along the axis direction of the rotation guide member 31, so that the movement of the driver bit 2 and the decrease in transmission efficiency of the force for pushing the screw 200 via the driver bit 2 can be suppressed.

Thereby, the wire 54 between the pulley 52 and the second moving member 32c is stretched linearly along the moving direction of the moving member 32, and increases in load at a time of winding up the wire 54 by the pulley 52 and load at a time of pulling out the wire 54 from the pulley 52 are suppressed.

Note that, since the wire 54 has flexibility that enables the winding on the pulley 52, the wire cannot move the moving member 32 rearward by pushing the second moving member 32c. Therefore, provided is the urging member 33 that is compressed as the moving member 32 moves in the forward direction denoted with the arrow A1 and applies a force, which pushes the moving member 32 in the rearward direction denoted with the arrow A2, to the moving member 32. Thereby, in the configuration where the wire 54 is wound by the pulley 52 and the driver bit 2 is advanced, the driver bit 2 after the advance can be moved rearward.

In addition, the holding member 30 configured to hold the driver bit 2 is supported to be movable in the front and rear direction with respect to the rotation guide member 31 and is configured to rotate together with the rotation guide member 31 by the engagement between the connecting members 30b provided to the holding member 30 and the groove portions 31a provided to the rotation guide member 31.

Therefore, in the configuration where the bit rotating motor 40 is arranged coaxially with the rotation guide member 31, the holding member 30, and the driver bit 2 held by the holding member 30, it is possible to implement a configuration where the driver bit 2 is rotated and the driver bit 2 is moved in the front and rear direction without moving the bit rotating motor 40 in the front and rear direction.

Note that, in the configuration where the bit rotating motor 40 is arranged coaxially with the driver bit 2, a configuration is considered in which the rotation operation of the bit rotating motor 40 is converted into the movement of the driver bit 2 in the front and rear direction by using a feed screw.

However, in the configuration where the feed screw is used, an amount of advance of the driver bit 2 per rotation of the motor cannot be increased, so that it is difficult to increase the moving speed of the driver bit 2 even when the rotation speed of the motor is increased.

In the fastening tool 1, it is necessary to increase the moving speed of the driver bit 2 so as to shorten a time required to press the screw 200 against the fastening target with the driver bit 2. However, in the configuration where the feed screw is used, it is difficult to shorten the time required to press the screw 200 against the fastening target with the driver bit 2.

In contrast, in the configuration where the holding member 30 configured to hold the driver bit 2 is supported so as to be movable in the front and rear direction with respect to the rotation guide member 31, the pulley 52 is rotated by the second drive unit 5 to wind up the wire 54, and to move the holding member 30 forward, the moving speed of the driver bit 2 can be increased according to the rotation speed of the bit moving motor 50. Therefore, it is possible to shorten the time required to press the screw 200 against the fastening target with the driver bit 2.

Figure 7A:
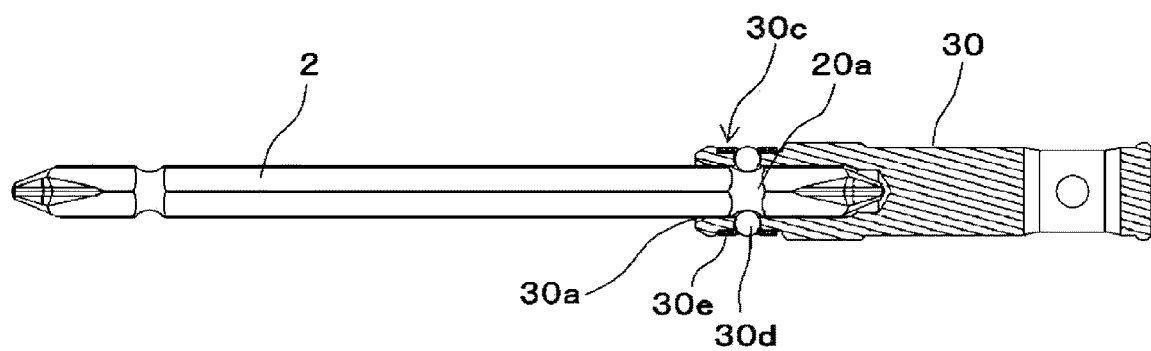
FIG. 7A is a cross-sectional view showing an example of an attaching/detaching holding mechanism.
Figure 7B:
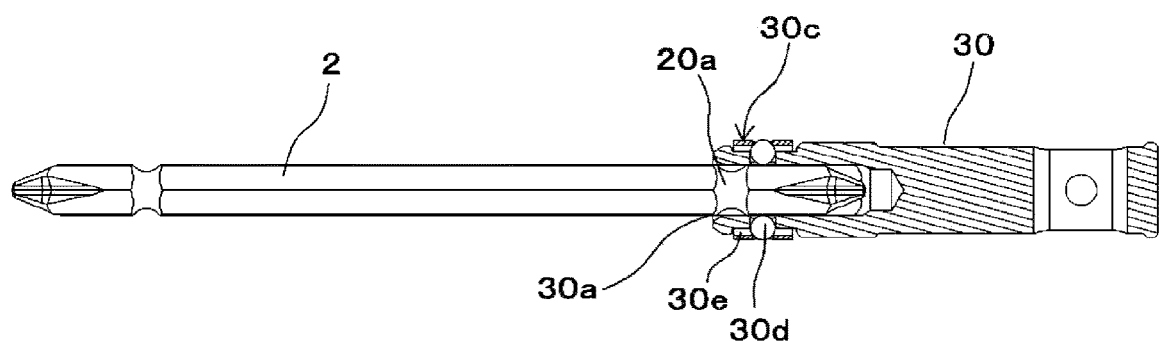
FIG. 7B is a cross-sectional view showing the example of the attaching/detaching holding mechanism.
Figure 8A:
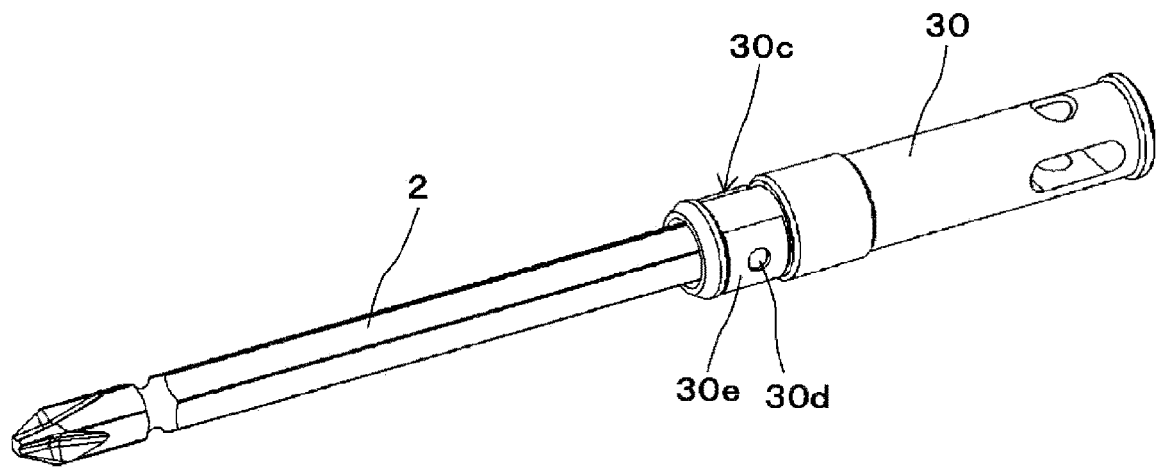
FIG. 8A is a perspective view showing the example of the attaching/detaching holding mechanism.
Figure 8B:
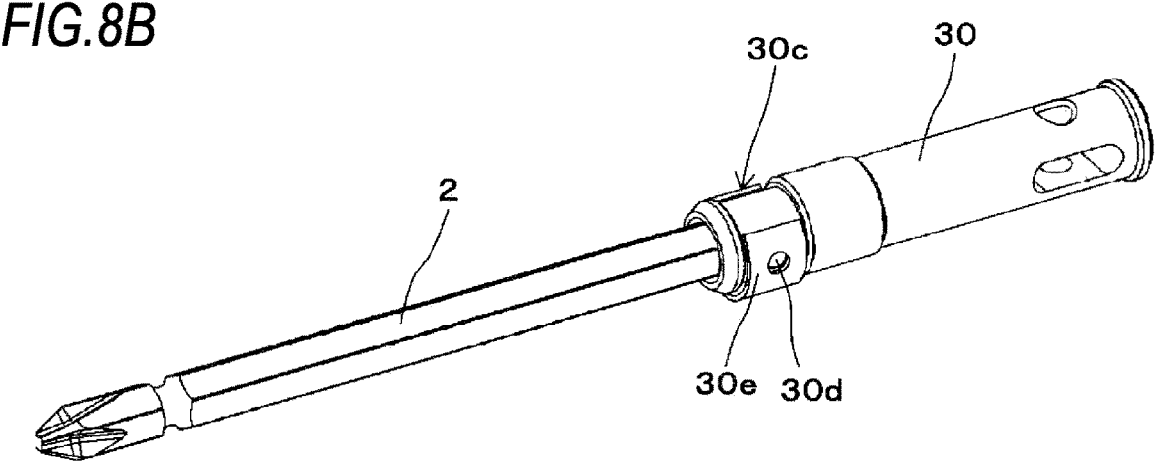
FIG. 8B is a perspective view showing the example of the attaching/detaching holding mechanism.

FIGS. 7A and 7B are cross-sectional views showing an example of an attaching/detaching holding mechanism, and FIGS. 8A and 8B are perspective views showing the example of the attaching/detaching holding mechanism, showing details of the attaching/detaching holding mechanism 30c. Next, the attaching/detaching holding mechanism 30c is described with reference to the respective drawings.

The attaching/detaching holding mechanism 30c includes a ball 30d exposed in the opening 30a and a spring 30e for pressing the ball 30d in a direction in which the ball is exposed in the opening 30a. The spring 30e is an example of the pressing member, and is constituted by a leaf spring, an urging member such as a coil, or an elastic member such as rubber, and in the present example, is constituted by an annular leaf spring and is fitted on the outer periphery of the holding member 30.

When the insertion portion 20 of the driver bit 2 is inserted into the opening 30a of the holding member 30, the attaching/detaching holding mechanism 30c causes the ball 30d pushed by the insertion portion 20 to retreat in the outer periphery direction of the holding member 30 while deforming the spring 30e in a direction in which a diameter of the annular spring 30e increases.

When the insertion portion 20 of the driver bit 2 is inserted into the opening 30a of the holding member 30 up to a position where a groove portion 20a formed on the outer periphery of the insertion portion 20 faces the ball 30d, the ball 30d urged by the spring 30e is fitted into the groove portion 20a. This prevents the driver bit 2 from being carelessly separated from the holding member 30.

Further, when a predetermined force or more is applied in a direction in which the driver bit 2 is pulled out from the holding member 30, the ball 30d retreats while deforming the spring 30e in the direction in which the diameter of the annular spring 30e increases, so that the driver bit 2 can be pulled out from the holding member 30.

In the operation of inserting and pulling out the insertion portion 20 of the driver bit 2 with respect to the opening 30a of the holding member 30, the ball 30d retreats in the outer periphery direction of the holding member 30. For this reason, a space for retreating the ball 30d is required on the outer periphery of the holding member 30. On the other hand, the holding member 30 is inserted in the cylindrical rotation guide member 31, so that it is not possible to secure a space for retreating the ball 30d between the outer periphery of the holding member 30 and the inner periphery of the rotation guide member 31.

Further, when a diameter difference between the holding member 30 and the rotation guide member 31 is set so as to secure a space for retreating the ball 30d between the outer periphery of the holding member 30 and the inner periphery of the rotation guide member 31, it is necessary to increase an outer diameter of the rotation guide member 31 because a radial dimension of the driver bit 2 is determined and therefore the outer diameter of the holding member 30 cannot be reduced. For this reason, the size of the device becomes large.

In contrast, the rotation guide member 31 is provided with the groove portions 31a configured to guide the connecting members 30b. The groove portion 31a penetrates from the inner peripheral side to the outer peripheral side of the rotation guide member 31, and extends in the axis direction of the rotation guide member 31.

Therefore, the ball 30d of the attaching/detaching holding mechanism 30c is provided aligned with the position of the groove portion 31a of the rotation guide member 31. That is, in the holding member 30, the connecting member 30b and the ball 30d of the attaching/detaching holding mechanism 30c are provided coaxially along the axis direction of the rotation guide member 31. Thereby, the ball 30d of the attaching/detaching holding mechanism 30c is exposed to the groove portion 31a of the rotation guide member 31 in any of the operation in which the rotation guide member 31 and the holding member 30 rotate and the operation in which the holding member 30 moves in the axis direction with respect to the rotation guide member 31.

Therefore, the operation in which the insertion portion 20 of the driver bit 2 is inserted and pulled out with respect to the opening 30a of the holding member 30 causes the ball 30d retreating in the outer periphery direction of the holding member 30 to enter the groove portion 31a of the rotation guide member 31.

Therefore, with the configuration where the holding member 30 is inserted in the cylindrical rotation guide member 31, it is possible to secure a space for retreating the ball 30d of the attaching/detaching holding mechanism 30c. In addition, by using the groove portion 31a into which the connecting member 30b is inserted as a space for retreating the ball 30d, an area of the opening provided to the rotation guide member 31 is suppressed, and the strength can be secured.

Further, it is not necessary to secure a space for retreating the ball 30d between the outer periphery of the holding member 30 and the inner periphery of the rotation guide member 31 by increasing the diameter difference between the holding member 30 and the rotation guide member 31, so that it is possible to suppress the increase in size of the device.

Figure 9:
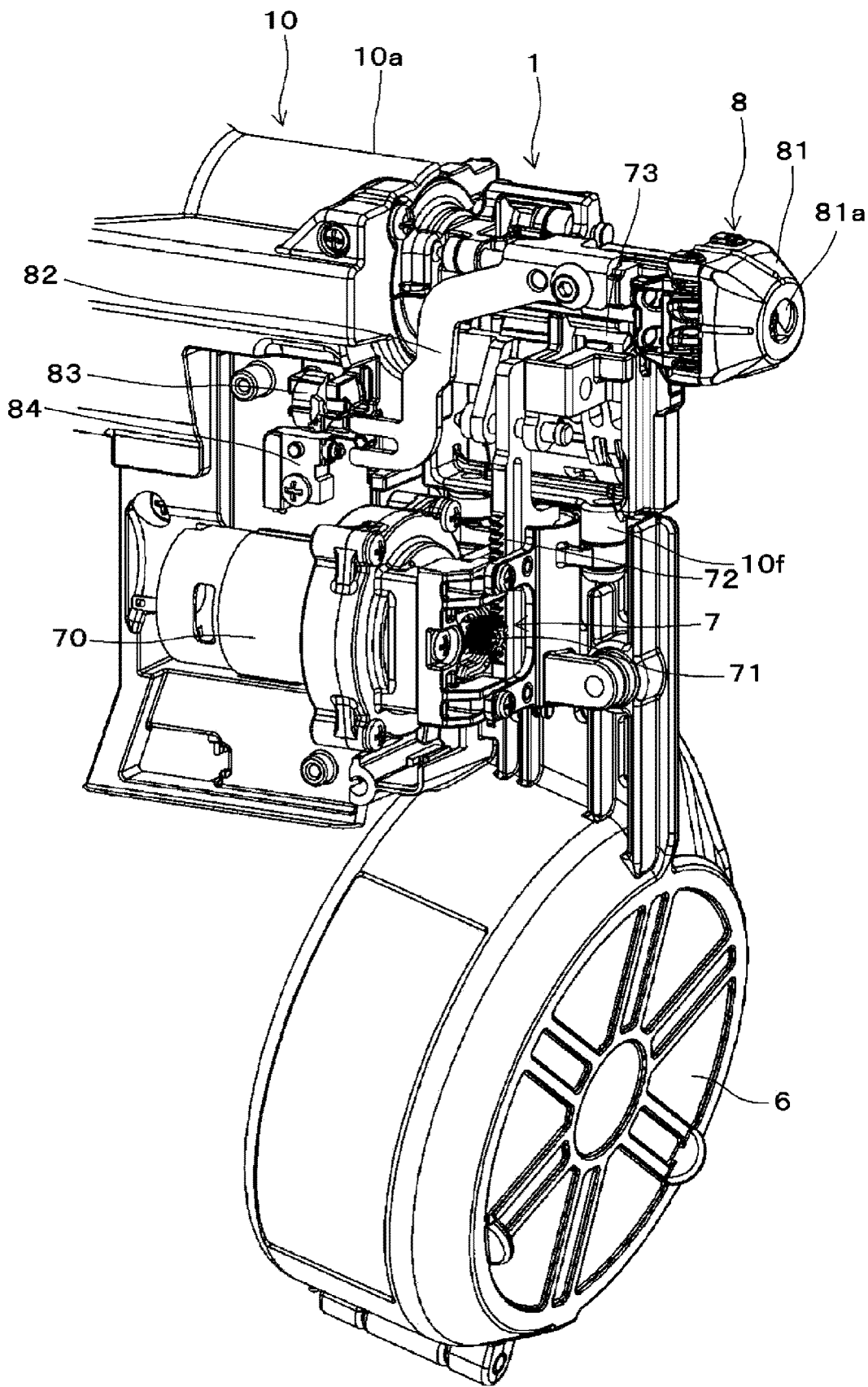
FIG. 9 is a perspective view showing an example of a screw feeding unit and a nose unit according to present embodiment.

FIG. 9 is a perspective view showing an example of a screw feeding unit and a nose unit according to present embodiment, showing details of the screw feeding unit 7 and the nose unit 8. Next, the screw feeding unit 7 and the nose unit 8 are described with reference to each drawing.

The screw feeding unit 7 includes a screw feeding motor 70, a pinion gear 71 attached to a shaft of the screw feeding motor 70 via a speed reducer, a rack gear 72 in mesh with the pinion gear 71, and an engaging part 73 connected to the rack gear 72 and engaged with the connected screw fed from the screw accommodating unit 6.

The rack gear 72 of the screw feeding unit 7 is supported to be movable in the upper and lower direction along a feeding direction of the connected screw. In the screw feeding unit 7, the screw feeding motor 70 rotates forward and reversely, so that the engaging part 73 engaged with the connected screw moves in the upper and lower direction and the connected screw is fed.

The nose unit 8 includes an ejection passage 80 to which the screw 200 is supplied by the screw feeding unit 7 and through which the driver bit 2 passes, a contact member 81 having an ejection port 81a formed to communicate with the ejection passage 80 and configured to come into contact with a fastening target, a contact arm 82 configured to move in the front and rear direction in conjunction with the contact member 81, and an adjusting part 83 configured to restrict an amount of movement of the contact arm 82. In addition, the nose unit 8 includes a cover member 88 configured to cover a path, through which the screw 200 is to pass, from the screw accommodating unit 6 to the ejection passage 80 in an openable and closable manner.

In the fastening tool 1, each component constituting the ejection passage 80, the contact member 81 and the contact arm 82 is assembled to constitute the nose unit 8, and is fixed to the front frame 10b and the nose body part 10f constituting the tool body 10. In addition, the fastening tool 1 includes a contact switch part 84 configured to be pushed and actuated by the contact arm 82.

In the nose unit 8, the contact member 81 is supported to be movable in the front and rear direction denoted with the arrows A1 and A2, and the contact arm 82 is configured to move in the front and rear direction in conjunction with the contact member 81. In the nose unit 8, the contact member 81 is urged forward by an urging member (not shown), and the contact member 81 pressed against the fastening target and moved rearward is urged and moved forward by the urging member.

In the nose unit 8, an amount of movement of the contact arm 82 until the contact arm 82 is moved rearward due to the pressing of the contact arm 81 against the fastening target and the contact switch part 84 is actuated is adjusted by the adjusting part 83. The contact switch part 84 is switched between actuation and non-actuation by being pushed by the contact arm 82. In the present example, a state where the contact switch part 84 is not pressed by the contact arm 82 and is not actuated is referred to as 'off of the contact switch part 84', and a state where the contact switch part 84 is pushed by the contact arm 82 and is thus actuated is referred to as 'on of the contact switch part 84'.

Next, configurations relating to control and operation of the fastening tool 1 are described with reference to the respective drawings. The fastening tool 1 includes a trigger 9 configured to receive an operation and a trigger switch part 90 configured to be actuated by an operation of the trigger 9. The trigger 9 is provided on a front side of the handle 11 and is configured to be operable by a finger of a hand gripping the handle 11. The trigger switch part 90 is configured to be pushed and actuated by the trigger 9.

The trigger switch part 90 is switched between actuation and non-actuation by being pushed by the trigger 9. In the present example, a state where the trigger 9 is not operated, the trigger switch part 90 is not pushed by the trigger 9 and the trigger switch part 90 is not actuated is referred to as 'off of the trigger switch part 90', and a state where the trigger 9 is operated and the trigger switch part 90 is pushed and actuated by the trigger 9 is referred to as 'on of the trigger switch part 90'.

The fastening tool 1 includes a control unit 100 configured to control the first drive unit 4, the second drive unit 5 and the screw feeding unit 7, based on outputs of the trigger switch part 90 configured to be actuated by the operation of the trigger 9 and the contact switch part 84 configured to be pushed and actuated by the contact member 81.

The control unit 100 is constituted by a substrate on which various electronic components are mounted, and is provided to a substrate accommodating part 111 provided on a back surface-side of the screw accommodating unit 6 between the screw accommodating unit 6 and the handle 11.

In a case of an electric tool used with holding the handle by a hand, an accommodating unit for accommodating consumables such as screws is provided in front of the handle. In order to be able to grip the handle by a hand, a space for a finger is required between the handle and the accommodating unit.

Therefore, the fastening tool 1 is provided with the substrate accommodating part 111 on the back surface-side of the screw accommodating unit 6 by using a space between the screw accommodating unit 6 and the handle 11.

In a case of an electric tool used with holding the handle by a hand, a configuration is suggested in which a battery is attached to a lower part of the handle and a substrate is provided between the handle and the battery. With such a configuration, a dimension of the electric tool in the upper and lower direction along the extension direction of the handle is increased.

In contrast, the substrate accommodating part 111 is provided on the back surface-side of the screw accommodating unit 6, so that the increase in dimension of the fastening tool 1 in the upper and lower direction along the extension direction of the handle 11 is suppressed. Further, since the spirally wound connected screw is accommodated in the screw accommodating unit 6, a surface of the screw accommodating unit 6 facing the handle 11 is substantially circular. Thereby, it is possible to secure a volume of the substrate accommodating part 111 while suppressing the increase in size of the fastening tool 1.

Figure 10A:
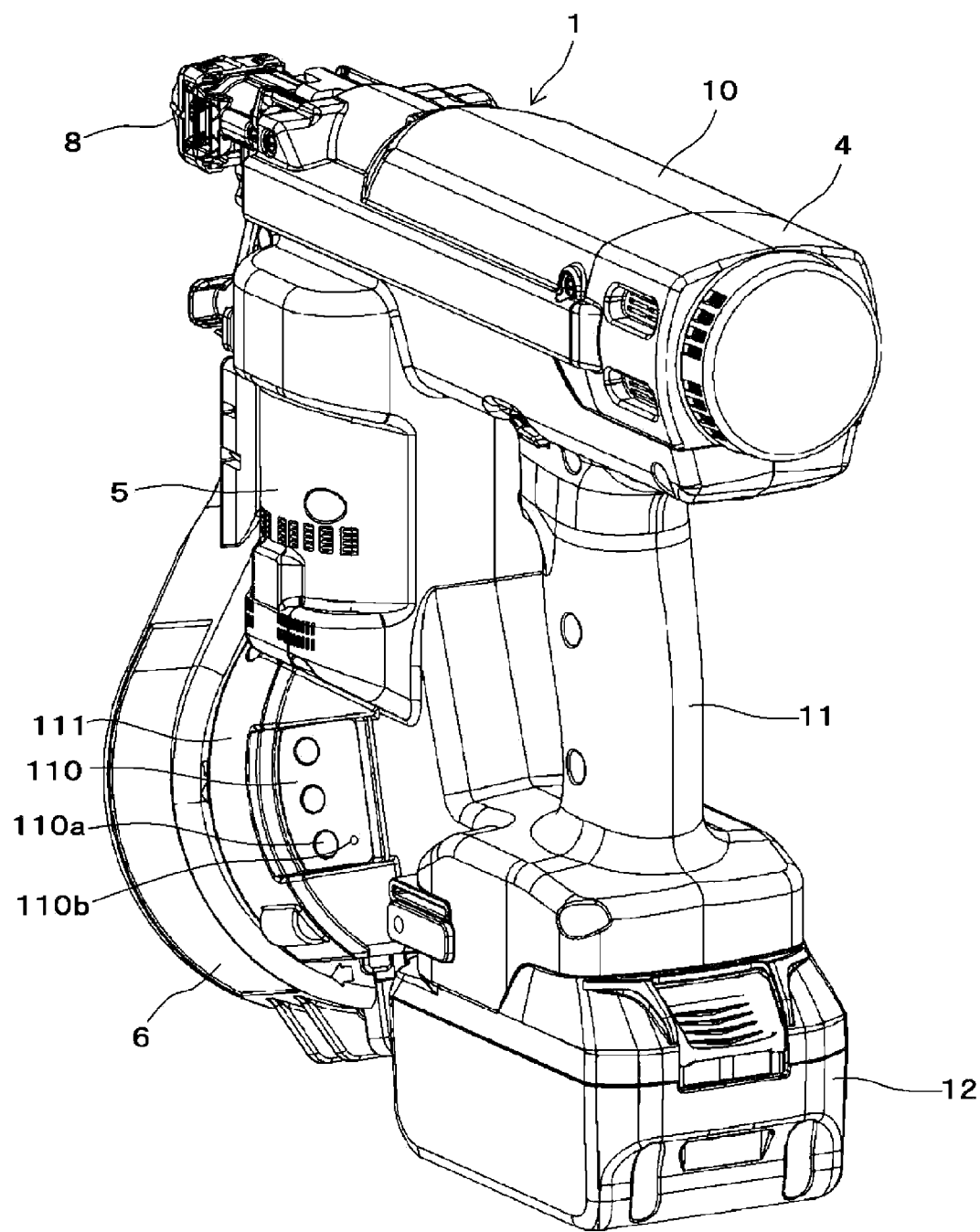
FIG. 10A is a perspective view showing the example of the fastening tool according to the present embodiment, as seen from the rear.
Figure 10B:
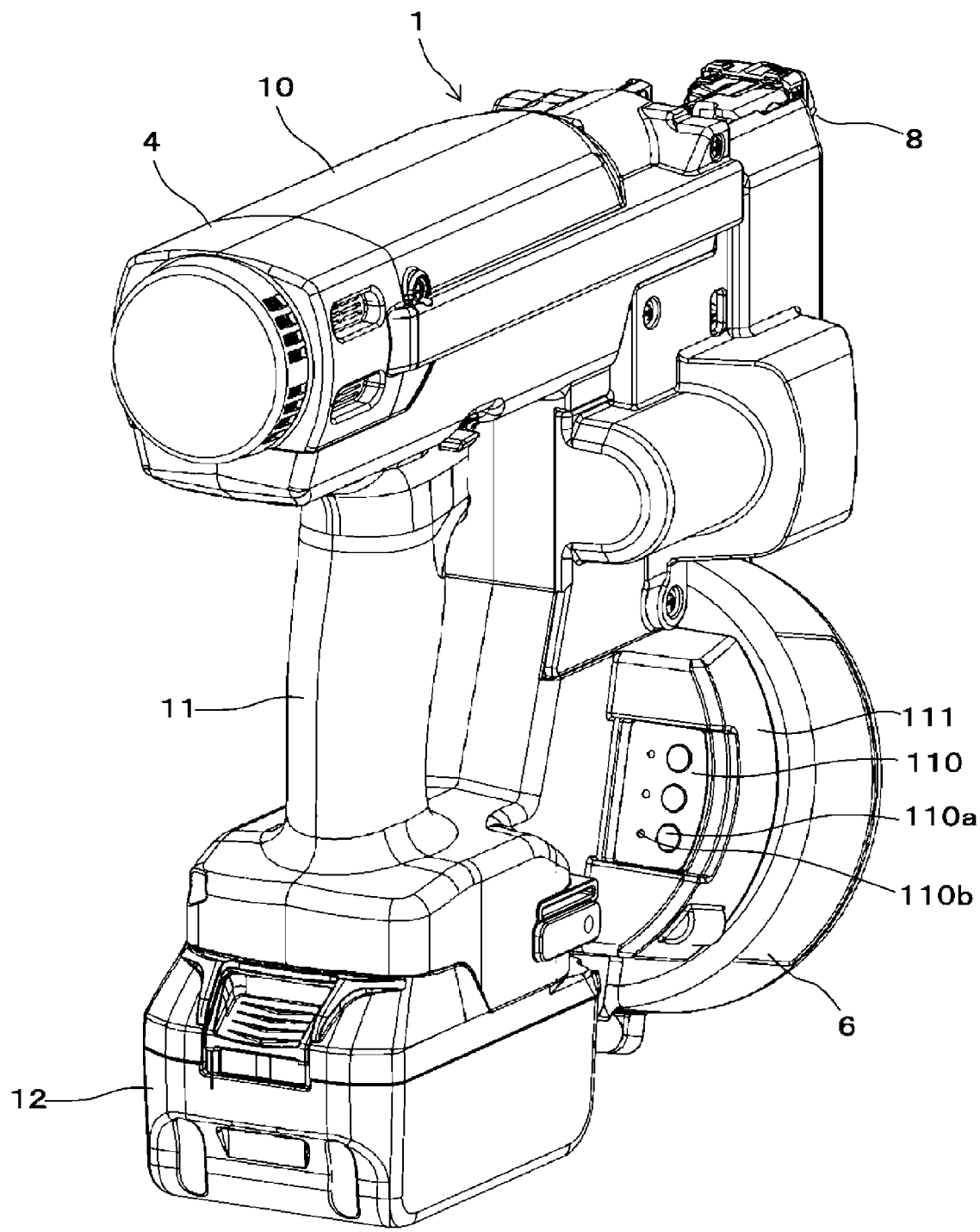
FIG. 10B is a perspective view showing the example of the fastening tool according to the present embodiment, as seen from the rear.
Figure 10C:
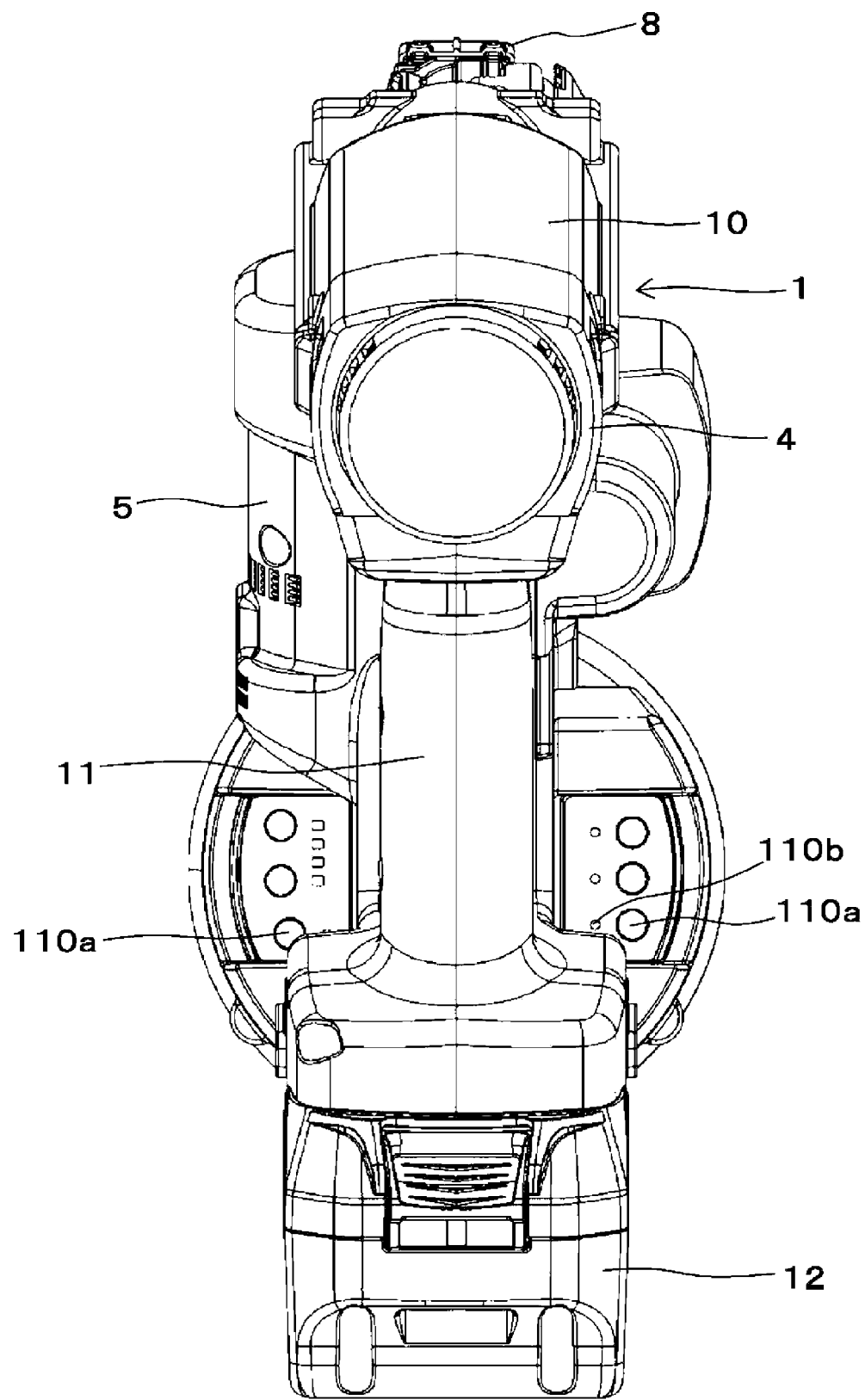
FIG. 10C is a perspective view showing the example of the fastening tool according to the present embodiment, as seen from the rear.
Figure 11:
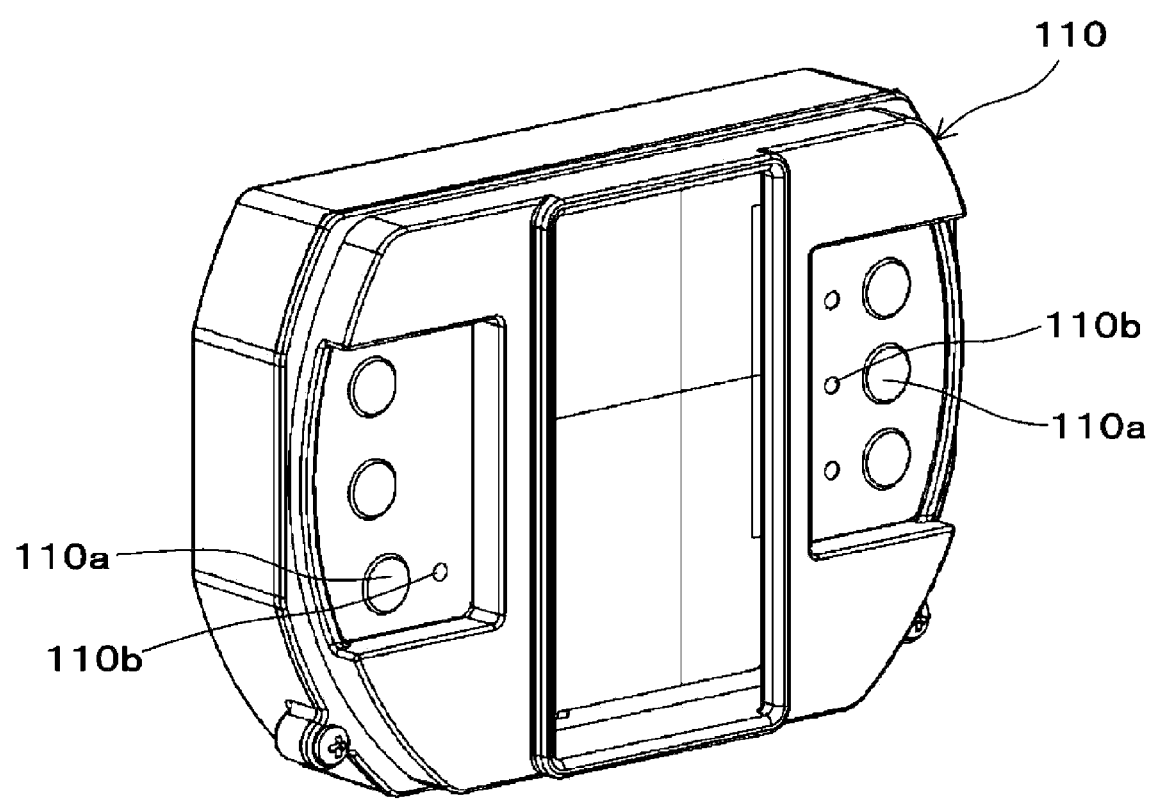
FIG. 11 is a perspective view showing an example of a setting unit.

FIGS. 10A to 10C are perspective views showing the example of the fastening tool according to the present embodiment, as seen from the rear, and FIG. 11 is a perspective view showing an example of a setting unit, showing a detail of a setting unit 110. Next, the setting unit 110 is described with reference to the respective drawings.

The fastening tool 1 includes the second drive unit 5 configured to move the driver bit 2 in the front and rear direction along the axis direction, and the second drive unit 5 is configured to be driven by the bit moving motor 50, and the moving member 32 connected, by the wire 54, to the pulley 52 configured to be driven and to rotate by the bit moving motor 50 and the holding member 30 connected to the moving member 32 are configured to move forward along the axis direction of the driver bit 2, along the rotation guide member 31.

Thereby, an amount of movement (amount of advance) of the driver bit 2 can be controlled by controlling an amount of rotation of the bit moving motor 50. That is, by rotating the bit moving motor 50 in conjunction with the rotation of the bit rotating motor 40 configured to rotate the driver bit 2 in a direction in which the screw 200 is fastened, the amount of advance of the driver bit 2 configured to advance following the screw 200 is controlled by an amount of rotation of the bit moving motor 50, as the screw 200 is fastened. As a result, a stop position of the driver bit 2 along the axis direction can be controlled.

Therefore, the fastening tool 1 includes a setting unit 110 configured to set an amount of advance of the driver bit 2. The setting unit 110 is an example of the setting means, and is configured so that any setting value can be selected from a plurality of setting values or any setting value can be selected steplessly.

In the present example, the setting unit 110 is configured so that a setting value is selected by an operation unit 110a constituted by a button. In addition, the operation unit 110a may be configured such that a setting value is selected by a rotary dial. Further, the setting unit 110 may have a configuration of displaying a selected setting value by a method of indicating a current value with a label, a stamp or the like, a method of indicating a current value with a display unit 110b such as an LED or the like, or the like so that an operator can easily perceive the current setting value.

The setting unit 110 is provided on each of both left and right sides of a surface of a side, which faces the handle 11, of the substrate accommodating part 111 provided on the back surface-side of the screw accommodating unit 6.

This makes it possible to visually recognize the setting unit 110 from both the left and right sides of the handle 11, when seeing the fastening tool 1 from the rear.

In a use aspect in which the handle 11 is held by a hand, the surface of the side of the screw accommodating unit 6, which faces the handle 11, faces toward the operator holding the fastening tool 1. Thereby, the setting unit 110 is provided on the surface of the side, which faces the handle 11, of the substrate accommodating part 111 provided on the back surface-side of the screw accommodating unit 6, so that the display unit 110b provided on the setting unit 110 can be easily seen. Therefore, it is possible to reduce a possibility that the operator will miss the display. Note that, the content that is displayed on the display unit 110b includes an ON/OFF state of a power supply, an operation mode selected from a variety of selectable operation modes, presence or absence of a screw, a remaining amount of screws, presence or absence of an abnormality, and the like, in addition to a setting value of a screw depth prescribed by an amount of advance of the driver bit 2.

In addition, in the use aspect in which the handle 11 is held by a hand, the operation unit 110a such as a button provided on the setting unit 110 can also be easily seen. Therefore, in a state of holding the handle 11 with one hand, the operation unit 110a can be operated with the other hand while visually recognizing the operation unit 110a, so that the operation can be reliably performed. Further, the display unit 110b can be seen without changing a posture or largely changing the line of sight during a work, so that it is possible to prevent an alarm or the like from not being noticed during a continuous work. Further, it is possible to prevent the ejection port 81a from being unconsciously directed toward the operator when the operator tries to gaze at the display unit 110b or the operation unit 110a.

In addition, the substrate constituting the control unit 100 is accommodated in the substrate accommodating part 111. A surface of a side, which faces the handle 11, of the substrate is mounted with switches and the like constituting the operation unit 110a and lamps and the like constituting the display unit 110b, so that a substrate for the setting unit 110 separate from the control unit 100 can be omitted.

Operation Example of Fastening Tool of Present Embodiment

Figure 12A:
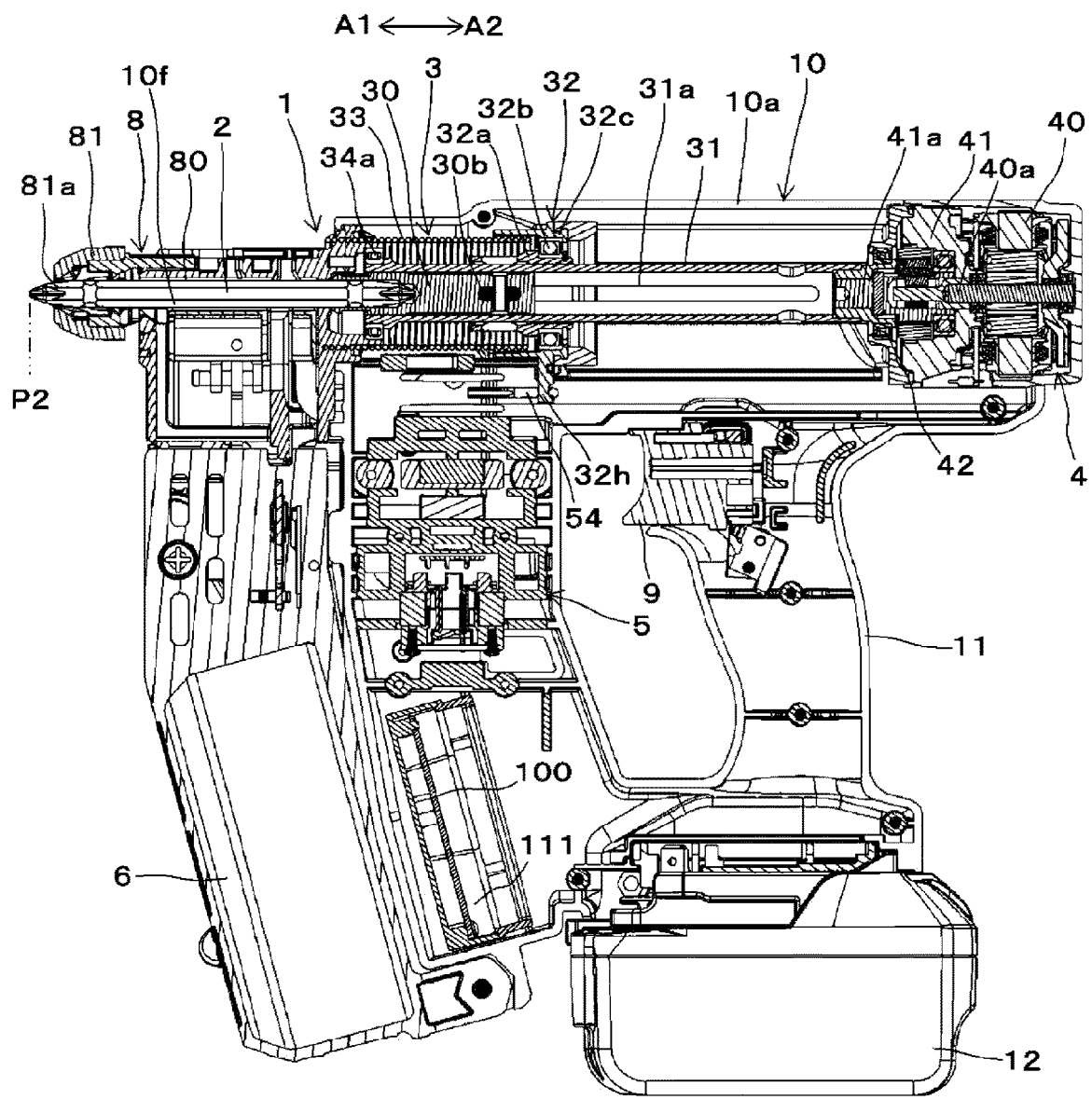
FIG. 12A is a side cross-sectional view showing an example of an operation of the fastening tool according to the present embodiment.
Figure 12B:
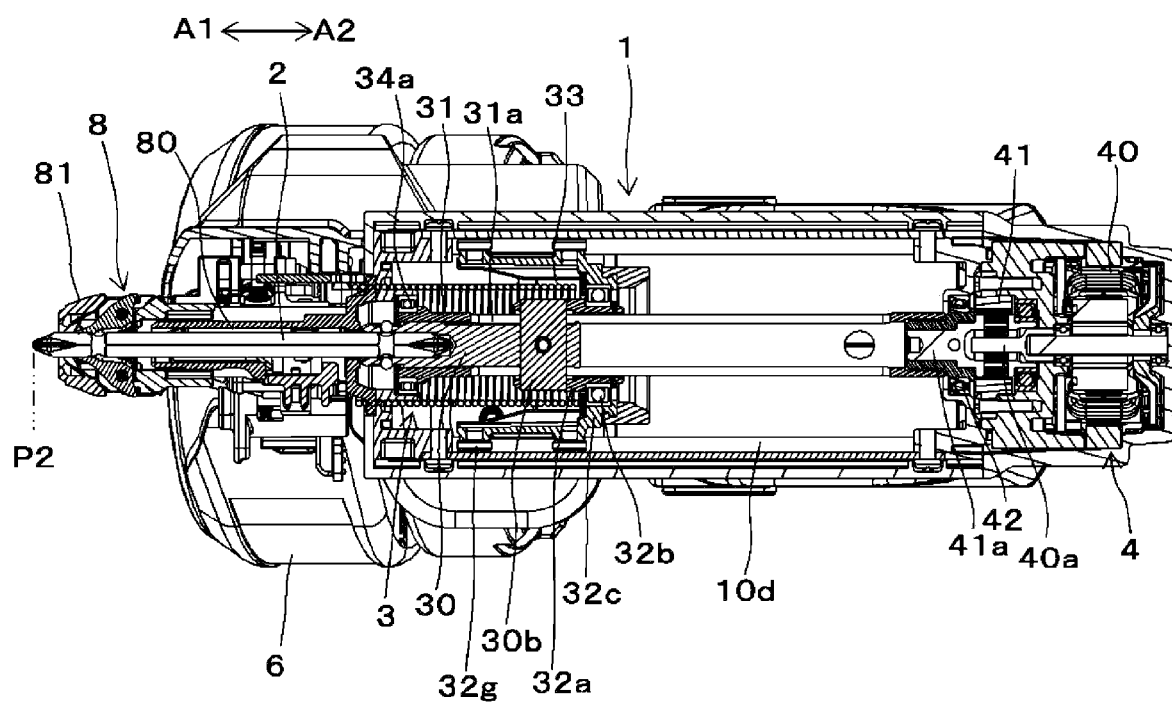
FIG. 12B is a top cross-sectional view showing the example of the operation of the fastening tool according to the present embodiment.

FIG. 12A is a side cross-sectional view showing an example of an operation of the fastening tool according to the present embodiment, and FIG. 12B is a top cross-sectional view showing the example of the operation of the fastening tool according to the present embodiment. Next, a fastening operation of the fastening tool according to the present embodiment is described with reference to the respective drawings.

In a standby state, as shown in FIG. 1A, a tip end of the driver bit 2 is located at a standby position P1 behind the ejection passage 80, and the fastening tool 1 can supply the screw 200 to the ejection passage 80.

When the contact member 81 is pressed against the fastening target, the contact switch part 84 is pushed by the contact arm 82, the contact switch part 84 becomes on, the trigger 9 is operated and the trigger switch part 90 becomes on, the control unit 100 drives the bit moving motor 50 of the second drive unit 5 and also drives the bit rotating motor 40 of the first drive unit 4 at a predetermined timing.

When the bit moving motor 50 is driven and rotates in a positive direction, which is one direction, the pulley 52 rotates in the positive direction, so that the wire 54 is wound on the pulley 52. The wire 54 is wound on the pulley 52, so that the second moving member 32*c* connected to the wire 54 is guided to the rotation guide member 31 and moves forward along the axis direction. When the second moving member 32*c* moves forward, the first moving member 32*a* is pushed by the second moving member 32*c* via the bearing 32*b*, and moves forward along the axis direction while compressing the urging member 33, together with the second moving member 32*c*.

When the first moving member 32*a* moves forward, the connecting members 30*b* are guided to the groove portions 31*a* of the rotation guide member 31, so that the holding member 30 connected to the first moving member 32*a* by the connecting members 30*b* moves forward along the axis direction of the driver bit 2.

Thereby, the driver bit 2 held by the holding member 30 moves in the forward direction denoted with the arrow A1, engages with the screw 200 supplied to the ejection port 81*a* of the nose unit 8, moves the screw 200 forward and presses the same against the fastening target.

When the bit rotating motor 40 is driven and rotates in the positive direction, which is one direction, the rotation guide member 31 rotates in the positive direction. When the rotation guide member 31 rotates in the positive direction, the connecting members 30*b* connected to the holding member 30 is pushed by the groove portions 31*a* of the rotation guide member 31, so that the holding member 30 rotates together with the rotation guide member 31.

Thereby, the driver bit 2 held by the holding member 30 rotates the screw 200 in the positive direction (clockwise direction) and screws the same into the fastening target. The control unit 100 moves forward the driver bit 2 by the second drive unit 5 to make the driver bit 2 to follow the screw to be screwed into the fastening target, based on a load applied to the bit rotating motor 40, the number of rotations of the bit rotating motor 40, a load applied to the bit moving motor 50, the number of rotations of the bit moving motor 50, and the like, in conjunction with the operation of rotating the driver bit 2 by the first drive unit 4 to screw the screw into the fastening target.

As shown in FIGS. 12A and 12B, the control unit 100 stops the driving of the bit rotating motor 40 and moves reversely the bit moving motor 50 when the tip end of the driver bit 2 protrudes from the ejection port 81*a* of the contact member 81 and reaches a predetermined actuation end position P2. The control unit 100 determines that the tip end of the driver bit 2 has reached the actuation end position P2, based on the number of rotations of the bit moving motor 50.

When the bit moving motor 50 rotates in an opposite direction, which is the other direction, the pulley 52 rotates in the opposite direction, so that the wire 54 is pulled out from the pulley 52. The wire 54 is pulled out from the pulley 52, so that the urging member 33 compressed by the second moving member 32*c* moving forward is stretched to push the second moving member 32*c* rearward.

The second moving member 32*c* is pushed rearward by the urging member 33, so that it is guided to the rotation guide member 31 and moves rearward along the axis direction. When the second moving member 32*c* moves rearward, the first moving member 32*a* is pushed by the second moving member 32*c* via the bearing 32*b*, and moves rearward along the axis direction, together with the second moving member 32*c*.

When the first moving member 32*a* moves rearward, the connecting members 30*b* are guided to the groove portions 31*a* of the rotation guide member 31, so that the holding member 30 connected to the first moving member 32*a* by the connecting members 30*b* moves rearward along the axis direction of the driver bit 2.

Thereby, the driver bit 2 held by the holding member 30 moves rearward, and the tip end of the driver bit 2 returns to the standby position P1. Note that, the moving member 32 is provided with the cushioning member 32*d* made of rubber or the like on a rear side of the second moving member 32*c*, so that while the second moving member 32*c* moves rearward, the second moving member 32*c* is suppressed from directly colliding with the rear frame 10*c*, and therefore, sound generation and damage can be suppressed. When the second moving member 32*c* is pushed rearward by the urging member 33 and the tip end of the driver bit 2 returns to the standby position P1, the control unit 100 stops the rotation of the bit moving motor 50. When the trigger switch part 90 becomes off, the control unit 100 rotates the screw feeding motor 70 in one direction to lower the engaging part 73. When the engaging part 73 descends to a position where it engages with a next screw 200, the control unit 100 raises the engaging part 73 by rotating reversely the screw feeding motor 70, and supplies the next screw 200 to the ejection passage 80.

Figure 13A:
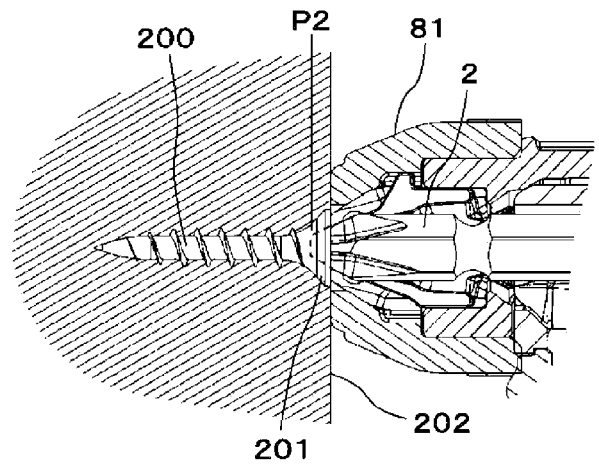
FIG. 13A is a cross-sectional view showing a fastened state of a screw.
Figure 13B:
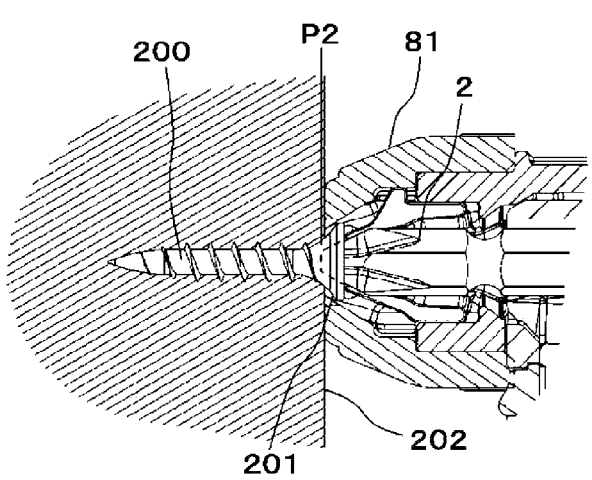
FIG. 13B is a cross-sectional view showing a fastened state of the screw.
Figure 13C:
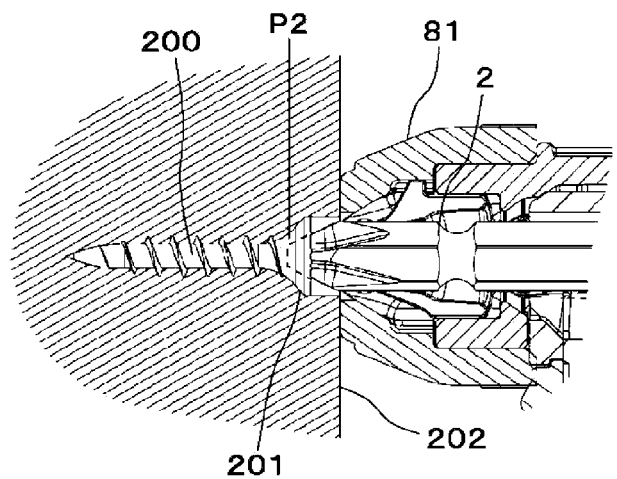
FIG. 13C is a cross-sectional view showing a fastened state of the screw.

FIGS. 13A to 13C are cross-sectional views showing fastened states of the screw, in which FIG. 13A shows a state where a head portion 201 of the screw 200 does not float or is not buried with respect to a surface of a fastening target 202, i.e., is so-called flush with the surface, FIG. 13B shows a state where the head portion 201 of the screw 200 floats from the fastening target 202, and FIG. 13C shows a state where the head portion 201 of the screw 200 is buried in the fastening target 202.

In the fastening tool 1, in a case where the screw 200 is a countersunk screw, the amount of advance of the driver bit 2 is preferably set so that a surface of the head portion 201 of the screw 200 becomes the same as, so-called flush with the surface of the fastening target 202 when the tip end of the driver bit 2 reaches the actuation end position P2, as shown in FIG. 13A. Note that, the screw 200 is not limited to the countersunk screw, and in a case of a pan, a bind, a truss, or the like, the amount of advance of the driver bit 2 is preferably set so that the seat surface of the head portion 201 of the screw 200 is in contact with the surface of the fastening target 202 and the head portion 201 of the screw 200 does not float from the fastening target 202.

In a case where the head portion 201 of the screw 200 floats from the fastening target 202 at the time when the tip end of the driver bit 2 reaches the actuation end position P2, as shown in FIG. 13B, the amount of advance of the driver bit 2 may be increased to advance the actuation end position P2. On the other hand, in a case where the head portion 201 of the screw 200 is buried in the fastening target 202, as shown in FIG. 13C, the amount of advance of the driver bit 2 may be reduced to retreat the actuation end position P2.

Therefore, the amount of movement (amount of advance) of the driver bit 2 can be set by the setting unit 110. The amount of movement (amount of advance) of the driver bit 2 is prescribed by the number of rotations (amount of rotation) of the bit moving motor 50. The bit moving motor 50 is rotated by a set amount of rotation with the standby position P1, which is an initial position of the driver bit 2, as a starting point, and is then stopped or reversely rotated to control the actuation end position P2. Therefore, the fastening target can be adjusted.

Additional Notes

This application discloses at least the following inventions (1) to (11).

(1) A fastening tool includes: a cylindrical rotation guide member extending in one direction and rotatably supported; a holding member having an opening to which a driver bit is detachably inserted, and configured to move in an axis direction along the extension direction of the rotation guide member inside the rotation guide member and to rotate together with the rotation guide member; and a moving member configured to move the holding member in a front and rear direction along the rotation guide member.

In the present invention, when a drive force for rotating the rotation guide member is transmitted, the holding member rotates together with the rotation guide member, and the driver bit attached to the holding member rotates in a direction around an axis. In addition, when a drive force for moving the moving member in the axis direction is transmitted, the rotation guide member rotates with respect to the moving member and the holding member moves in the axis direction, so that the driver bit moves in the axis direction while rotating.

(2) The fastening tool according to (1), where the moving member includes: a first moving member connected to the holding member and configured to rotate together with the holding member and the rotation guide member and to move in the axis direction along the rotation guide member, and a second moving member configured to rotatably support the first moving member and to move in the axis direction along the rotation guide member.

(3) The fastening tool according to (2), where the moving member is configured such that the second moving member rotatably supports the first moving member via a bearing and the second moving member moves the first moving member in the axis direction via the bearing.

(4) The fastening tool according to (2) or (3), where the rotation guide member has a groove portion extending in the axis direction. The holding member and the first moving member are connected via a connecting member configured to enter the groove portion. The connecting member is supported in the groove portion so as to be movable along the axis direction of the rotation guide member. A rotation operation of the rotation guide member causes the connecting member to be pushed by one side surface or the other side surface of the groove portion according to a rotation direction of the rotation guide member, and to be applied with a force in a circumferential force from the rotation guide member.

(5) The fastening tool according to any one of (2) to (4), includes: a first drive unit having a first motor configured to rotate the rotation guide member, and a second drive unit having a second motor configured to move the second moving member along the axis direction.

(6) The fastening tool according to (4), where the connecting member is configured to penetrate the holding member in a radial direction and to protrude from the holding member.

(7) The fastening tool according to (5), where the first motor is configured to be driven by electricity supplied from a first battery, and the second motor is configured to be driven by electricity supplied from the first battery.

(8) A fastening tool includes: a cylindrical rotation guide member extending in one direction and rotatably supported by a bearing; a holding member having an attaching/detaching holding mechanism configured to detachably hold a driver bit and provided in an opening to which the driver bit is inserted, and configured to move in an axis direction along the extension direction of the rotation guide member inside the rotation guide member and to rotate together with the rotation guide member; and a moving member configured to move the holding member in a front and rear direction along the rotation guide member. The rotation guide member has a groove portion extending in the axis direction. The holding member and the rotation guide member are connected via a connecting member configured to enter the groove portion. The attaching/detaching holding mechanism comprises a ball exposed in the opening and a pressing member configured to press the ball in a direction in which the ball is exposed in the opening. The connecting member and the ball of the holding member are provided coaxially along the axis direction of the rotation guide member.

In the present invention, in operations of inserting and removing the driver bit with respect to the opening of the holding member, the ball retreated in an outer periphery direction of the holding member enters the groove portion of the rotation guide member.

(9) The fastening tool according to (8), where the ball of the attaching/detaching holding mechanism is provided aligned with a position of the groove portion of the rotation guide member.

(10) The fastening tool according to (9), where an operation in which the driver bit is inserted and pulled out with respect to the opening of the holding member causes the ball retreating in an outer periphery direction of the holding member to enter the groove portion of the rotation guide member.

(11) The fastening tool according to (8), where the connecting member is configured to penetrate the holding member in a radial direction and to protrude from the holding member.

In the present invention, a configuration where the driver bit is rotatably supported and the driver bit is supported to be movable in the direction in which the screw is fastened can be implemented with a simple mechanism.

In addition, in the present invention, the holding member of the driver bit is inserted into the cylindrical rotation guide member, so that a space for retreating the ball of the attaching/detaching holding mechanism can be secured. Thereby, in the fastening tool configured to implement rotation of the driver bit and movement in the direction in which the screw is fastened with a simple configuration, a known attaching/detaching holding mechanism of a driver bit can be adopted.

The invention claimed is:

1. A fastening tool comprising:
a cylindrical rotation guide member extending in an extension direction and rotatably supported;
a holding member having an opening to which a driver bit is detachably inserted, and configured to move in an axis direction along the extension direction of the rotation guide member inside the rotation guide member and to rotate together with the rotation guide member; and
a moving member configured to move the holding member in a front and rear direction along the rotation guide member, the moving member comprising:
a first moving member connected to the holding member and configured to rotate together with the holding member and the rotation guide member and to move in the axis direction along the rotation guide member, and
a second moving member configured to rotatably support the first moving member and to move in the axis direction along the rotation guide member.

2. The fastening tool according to claim 1, wherein the moving member is configured such that the second moving member rotatably supports the first moving member via a bearing and the second moving member moves the first moving member in the axis direction via the bearing.

3. The fastening tool according to claim 1, wherein the rotation guide member has a groove portion extending in the axis direction,
wherein the holding member and the first moving member are connected via a connecting member configured to enter the groove portion,
wherein the connecting member is supported in the groove portion so as to be movable along the axis direction of the rotation guide member, and
wherein a rotation operation of the rotation guide member causes the connecting member to be pushed by one side surface or the other side surface of the groove portion according to a rotation direction of the rotation guide member, and to be applied with a force in a circumferential force from the rotation guide member.

4. The fastening tool according to claim 1, further comprising:
a first drive unit having a first motor configured to rotate the rotation guide member, and a second drive unit having a second motor configured to move the second moving member along the axis direction.

5. The fastening tool according to claim 3, wherein the connecting member is configured to penetrate the holding member in a radial direction and to protrude from the holding member.

6. The fastening tool according to claim 4, wherein the first motor is configured to be driven by electricity supplied from a first battery, and the second motor is configured to be driven by electricity supplied from the first battery.

7. A fastening tool comprising:
a cylindrical rotation guide member extending in an extension direction and rotatably supported by a bearing;
a holding member having an attaching/detaching holding mechanism configured to detachably hold a driver bit and provided in an opening to which the driver bit is inserted, and configured to move in an axis direction along the extension direction of the rotation guide member inside the rotation guide member and to rotate together with the rotation guide member; and
a moving member configured to move the holding member in a front and rear direction along the rotation guide member,
wherein the rotation guide member has a groove portion extending in the axis direction,
wherein the holding member and the rotation guide member are connected via a connecting member configured to enter the groove portion,
wherein the attaching/detaching holding mechanism comprises a ball exposed in the opening and a pressing member configured to press the ball in a direction in which the ball is exposed in the opening, and
wherein the connecting member and the ball of the holding member are provided coaxially along the axis direction of the rotation guide member.

8. The fastening tool according to claim 7, wherein the ball of the attaching/detaching holding mechanism is provided in alignment with a position of the groove portion of the rotation guide member.

9. The fastening tool according to claim 8, wherein an operation in which the driver bit is inserted and pulled out with respect to the opening of the holding member causes the ball retreating in an outer periphery direction of the holding member to enter the groove portion of the rotation guide member.

10. The fastening tool according to claim 7, wherein the connecting member is configured to penetrate the holding member in a radial direction and to protrude from the holding member.

* * * * *